US008950205B2

(12) United States Patent
Matracea et al.

(10) Patent No.: US 8,950,205 B2
(45) Date of Patent: *Feb. 10, 2015

(54) COOLING METHOD AND APPARATUS

(71) Applicant: Evaporcool Solutions, LLC, Memphis, TN (US)

(72) Inventors: Pat Matracea, Bartlett, TN (US); Rick Earles, Memphis, TN (US); Susan Ann Beinor, Sutton, MA (US); Gregory Steven Cook, Holliston, MA (US); Arthur Joseph Flagg, Sudbury, MA (US); Mark Thomas Marini, Concord, MA (US)

(73) Assignee: Evaporcool Solutions, LLC, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,579

(22) Filed: Jan. 28, 2013

(65) Prior Publication Data
US 2013/0264048 A1 Oct. 10, 2013

Related U.S. Application Data

(63) Continuation of application No. 12/427,370, filed on Apr. 21, 2009, now Pat. No. 8,359,875.

(60) Provisional application No. 61/046,775, filed on Apr. 21, 2008, provisional application No. 61/106,199, filed on Oct. 17, 2008.

(51) Int. Cl.
*F25B 39/04* (2006.01)
*F28D 3/00* (2006.01)
(Continued)

(52) U.S. Cl.
CPC ............... *F28D 15/00* (2013.01); *B01D 46/10* (2013.01); *B01D 46/4263* (2013.01); *F25D 23/003* (2013.01); *F25B 2339/041* (2013.01);
(Continued)

(58) Field of Classification Search
USPC ............... 62/121, 171, 181, 183, 259.4, 304, 62/176.6
See application file for complete search history.

(56) References Cited

U.S. PATENT DOCUMENTS 4,685,308 A * 8/1987 Welker et al. .................. 62/171
5,117,644 A 6/1992 Fought
(Continued)

OTHER PUBLICATIONS

Office Action issued Feb. 23, 2012 in U.S. Appl. No. 12/427,370.

*Primary Examiner* — Marc Norman
(74) *Attorney, Agent, or Firm* — Panitch Schwarze Belisario & Nadel LLP

(57) ABSTRACT

An apparatus and method to cool compressors, condensing coils, and similar devices. The compressor or condensing coil is cooled by the delivery of water, which may be ambient temperature or chilled. In one embodiment, the water is delivered to a mesh filter or screen via one or more mist spray nozzles. Water conduits may be integrated with the filter frame. The method to control the delivery of the water is designed to conserve water. The control circuit comprises a microcontroller device which contains programming that receives inputs, including but not limited to, outside ambient air temperature, condenser liquid line temperature, relative humidity and electric current, and uses said inputs to provide a stepwise level of control ("solenoid open time") of water delivery commensurate with outside air temperature and relative humidity.

16 Claims, 35 Drawing Sheets

(51) Int. Cl.
*F28D 15/00* (2006.01)
*B01D 46/10* (2006.01)
*B01D 46/42* (2006.01)
*F25D 23/00* (2006.01)

(52) U.S. Cl.
CPC ....... *F25B2700/02* (2013.01); *F25B 2700/151* (2013.01); *F25B 2700/21163* (2013.01); *F25D 2700/14* (2013.01)
USPC .................. 62/171; 62/176.6; 62/183; 62/304

(56) References Cited

U.S. PATENT DOCUMENTS

| | | | |
|---|---|---|---|
| 5,146,762 A * | 9/1992 | Atkins | 62/171 |
| 5,946,931 A | 9/1999 | Lomax et al. | |
| 6,381,980 B1 * | 5/2002 | Pringle | 62/305 |
| 6,619,059 B1 * | 9/2003 | Johnson, Sr. | 62/171 |
| 7,757,499 B2 | 7/2010 | Jensen | |
| 8,359,875 B2 | 1/2013 | Matracea et al. | |
| 2008/0104980 A1 * | 5/2008 | Payton | 62/171 |

* cited by examiner

SNAP FRAME
TUBING FUNCTIONS AS LEAD-IN.
CORNER ACTS AS A RELIEF FOR REMOVAL.

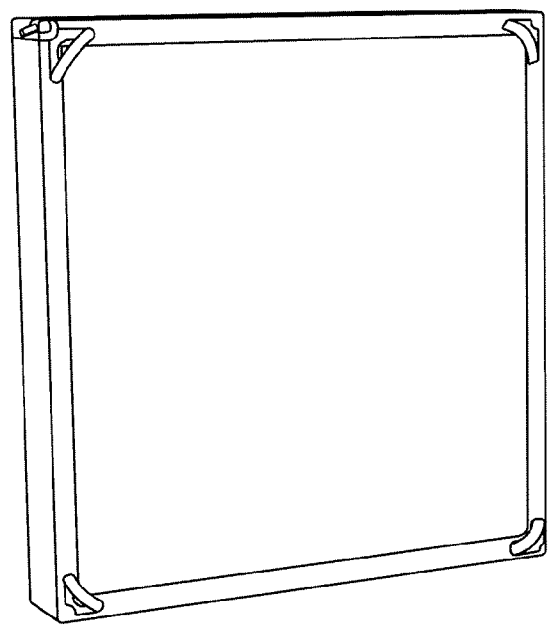
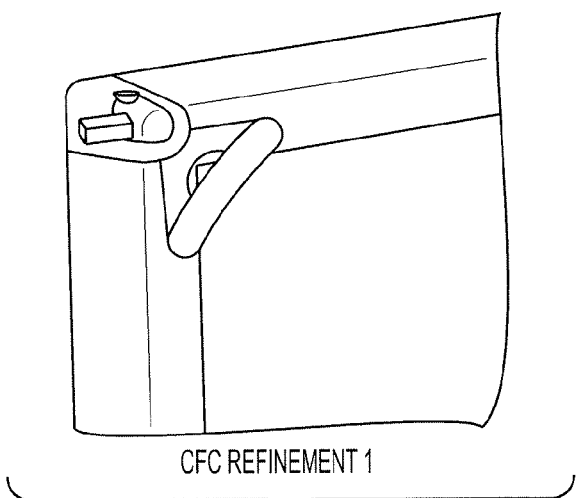
CFC REFINEMENT 1
FIG. 20

CFC REFINEMENT 2
ALTERNATE WATER INLET LOCATION.
SIMPLIFIED SCREEN/FILTER MOUNTING.

COOLING METHOD AND APPARATUS

This application is a continuation of U.S. patent application Ser. No. 12/427,370, filed Apr. 21, 2009, now issued as U.S. Pat. No. 8,359,875, issued Jan. 29, 2013, which claims benefit of and priority to U.S. Provisional Application No. 61/046,775, filed Apr. 21, 2008, and U.S. Provisional Application No. 61/106,199, filed Oct. 17, 2008, and is entitled to those filing dates for priority. The specifications, drawings, attachments, and complete disclosures of U.S. patent application Ser. No. 12/427,370 and U.S. Provisional Application Nos. 61/046,775 and 61/106,199 are incorporated herein by specific reference for all purposes.

FIELD OF THE INVENTION

This invention relates to a method and apparatus for cooling air compressors, condensing coils, or similar mechanical devices.

BACKGROUND OF THE INVENTION

The basic elements of a typical air conditioning unit 1 are a compressor 2, condenser 3, thermal expansion valve 4 and evaporator 5. A schematic diagram of a typical existing system is shown in FIG. 1. The equipment is typically laid out such that the evaporator is inside the air handling ductwork of the building to be cooled in order to provide cooling of the recirculated inside air 6. The compressor and condenser are typically located outside the building to reject the heat to the outside air 7. Interconnecting piping joins the internal portion of equipment to the external.

Normal controls provided with the unit work in a cycle based on temperature demand called by a thermostat. Refrigerant is expanded through a thermal expansion valve which lowers the pressure and temperature of the refrigerant. The refrigerant, now cold, passes through the evaporator coil which is located within the inside air duct. Hot indoor air forced past the evaporator is cooled and provided to the air distribution network. The refrigerant fluid absorbs heat during this step and returns to the compressor for a repeat of the cycle. Refrigerant is compressed in the vapor form as it passes through the compressor and routed through the condenser which rejects heat to the outside air and condenses most of the refrigerant to a liquid.

It is very important in the operation of such a system that the refrigerant entering the compressor is in a vapor state as liquid cannot be compressed. If refrigerant returns to the compressor containing a portion of liquid, a condition called liquid slugging, damage will occur to the compressor.

SUMMARY OF THE INVENTION

In various embodiments, the present invention comprises an apparatus and method to cool air compressors, condensing coils, and similar mechanical components. These components may exist in, but are not limited to, air conditioning units, refrigeration units, compressors of various sorts, and motor vehicles.

In one exemplary embodiment, an air conditioning coil is cooled by the delivery of water, which may be ambient temperature or chilled, to a filter apparatus. In one particular embodiment, the water may be delivered to a mesh filter or screen via nozzles.

In one embodiment, the control system is a microcontroller device which contains programming that reads ambient air temperature, condenser liquid line temperature, relative humidity, and electrical current sensors (to determine if compressor is running) to provide a stepwise level of control ("solenoid open time") of water delivery commensurate with these inputs. Alternatively, other methods of control may be used, such as those disclosed in U.S. Pat. Nos. 6,619,059 and 7,080,519, which are incorporated herein in their entireties by specific reference for all purposes.

In another embodiment, an apparatus is provided to cool and clean the outside air being routed through the condenser or compressor, reducing operating costs from energy and labor. A control system is provided to efficiently control the delivery of water to the filter apparatus, such that very little to none collects in the bottom of the filter frame. One result of using the new invention is lower operating costs as chilled or cooled air increases the efficiency of the condenser thereby running the compressor less to obtain the desired air conditioning effect, and cleaning the outside air greatly lowers the maintenance costs of cleaning the condenser fins of collected dust and flying debris.

BRIEF DESCRIPTION OF THE DRAWINGS

FIG. 20 is a front perspective view of a screen frame attached to a filter frame with side inlets.

DETAILED DESCRIPTION OF EXEMPLARY EMBODIMENTS

Figure 1:
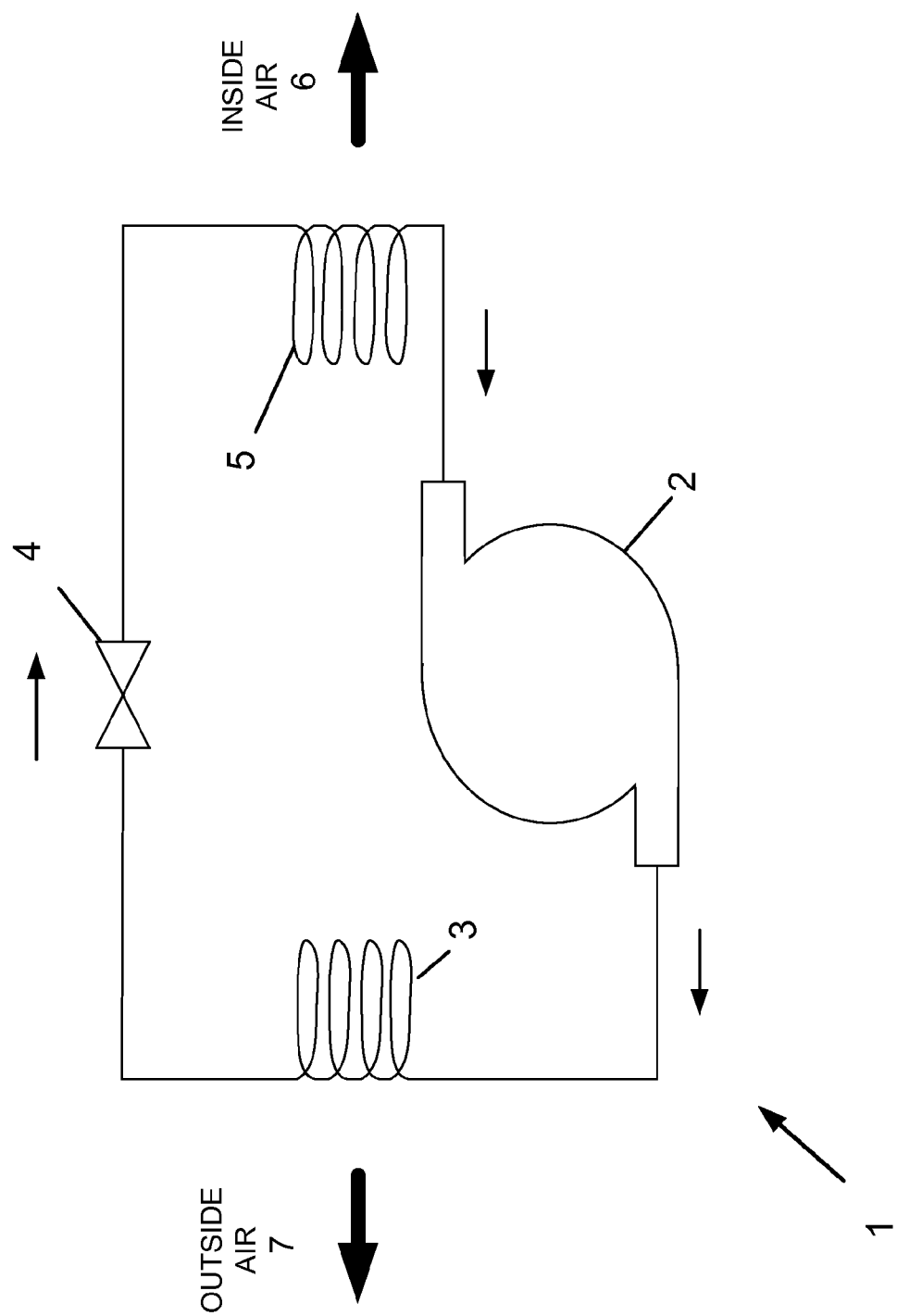
FIG. 1 is a schematic diagram of the basic elements of a typical air conditioning system.
Figure 2:
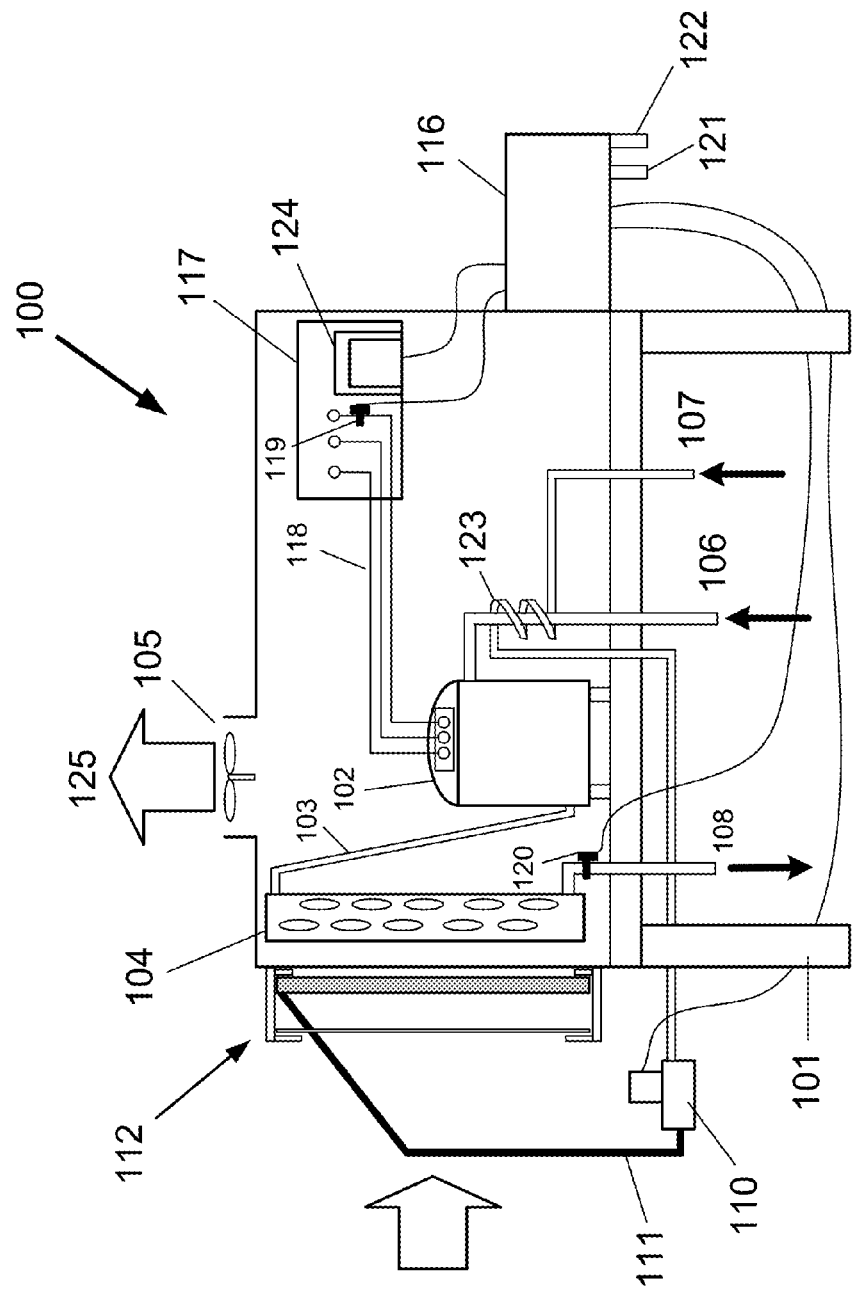
FIG. 2 is a cross-sectional view of the exterior equipment of a typical air conditioning system with the present invention installed.

Now, referring to FIG. 2, an embodiment of the system of the present invention is shown in cross-sectional view installed in a typical outdoor compressor/condenser unit system 100. In normal operation, vapor arriving in the suction line 106 is compressed in compressor 102 and introduced into the condenser 104 through compressor discharge line 103. The condensed effluent is routed out through condenser discharge line or liquid line 108 to the thermal expansion valve and evaporator (not shown).

In this embodiment, the present invention comprises a mounted filter apparatus 112, a source of water under pressure, such as a municipal water supply 107, a solenoid control valve 110 and an electronic control system 116. The water may be ambient temperature, or may be chilled. In the embodiment shown, the water line is formed into a tight loop 123 around the refrigerant suction line 106 which provides a decrease in water temperature due to its proximity to the cool suction line, and contributes to the cooling effect provided by the present invention. The water line may be insulated.

The present invention also may be connected to the compressor or air-conditioning system by means of an electronic control unit 116. The electronic control unit may be powered by its own or a separate power supply, or may be powered by a transformer 124 located within the compressor or air conditioning electrical enclosure. A temperature sensor 121 detects ambient air temperature. A relative humidity sensor 122 measures the relative humidity of the outside air. Alternating current electrical sensor 119 is mounted to a motor lead 118 and provides a signal that indicates when compressor 102 is running. Another temperature sensor 120 is mounted in tight contact with and measures the temperature of the condenser discharge line 108. All four of these inputs must meet certain conditions before the unit will operate. Filter apparatus 112 is mounted to the exterior of system 100 in a manner that forces airflow entering the condenser to first pass through the filter apparatus 112. Fan 105 provides forced airflow into condenser unit and out air discharge 125. Water, which may be chilled, is supplied to the filter apparatus 112 through water line 111 from solenoid valve 110.

Figure 3:
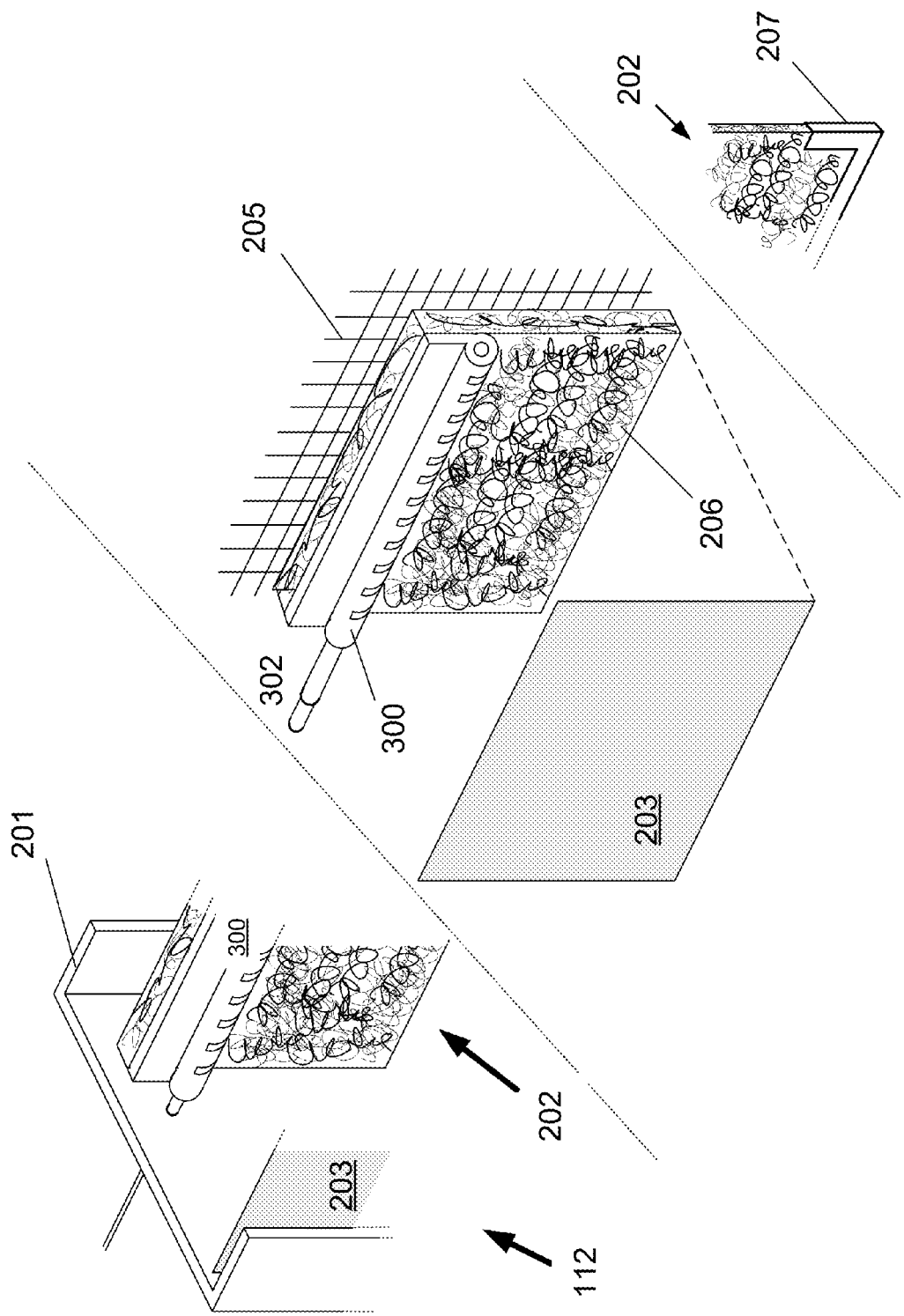
FIG. 3 is an oblique exploded view of a filter assembly in accordance with an embodiment of the present invention with a P-line tubing assembly.

Referring now to FIG. 3, the filter apparatus 112, in this embodiment, comprises filter frame 201, filter pack or pad 202, dust screen 203 and P-line assembly 300. The filter pack 202 is made up of filter 206 and netting or mesh layer 205 which provides deflection support to the filter element 206 in the airstream. The filter pack also may comprise a front screen on the side opposite the netting or mesh layer 205. Filter frame 201 is preferably made of extruded PVC suitable for exterior exposure although formed metal including, but not limited to, aluminum or galvanized or stainless steel may be used. Filter 206 may be made of fiberglass matting similar to furnace filter or paint booth filter material. Such material includes, but is not limited to, hammock roll fiberglass matting, such as that manufactured and sold by Protect Plus Industries. Netting or mesh layer 205 is a lightweight but strong mesh such as bird netting with up to approximately 1" openings, although a wide variation of mesh sizes would be suitable. Such material includes, but is not limited to, ½" opening utility netting manufactured and sold by Easy Gardener. The front screen may comprise any form of window screening, including, but not limited to, fiberglass window screen from manufacturers such as New York Wire. In one embodiment, the front screen and the dust screen 203 may be made of the same material. Filter 206 and netting or mesh layer 205, and front screen, if present, may be encompassed in a filter pack frame 207 to facilitate removal and replacement, although these components may be removed and replaced individually if needed.

Figure 4:
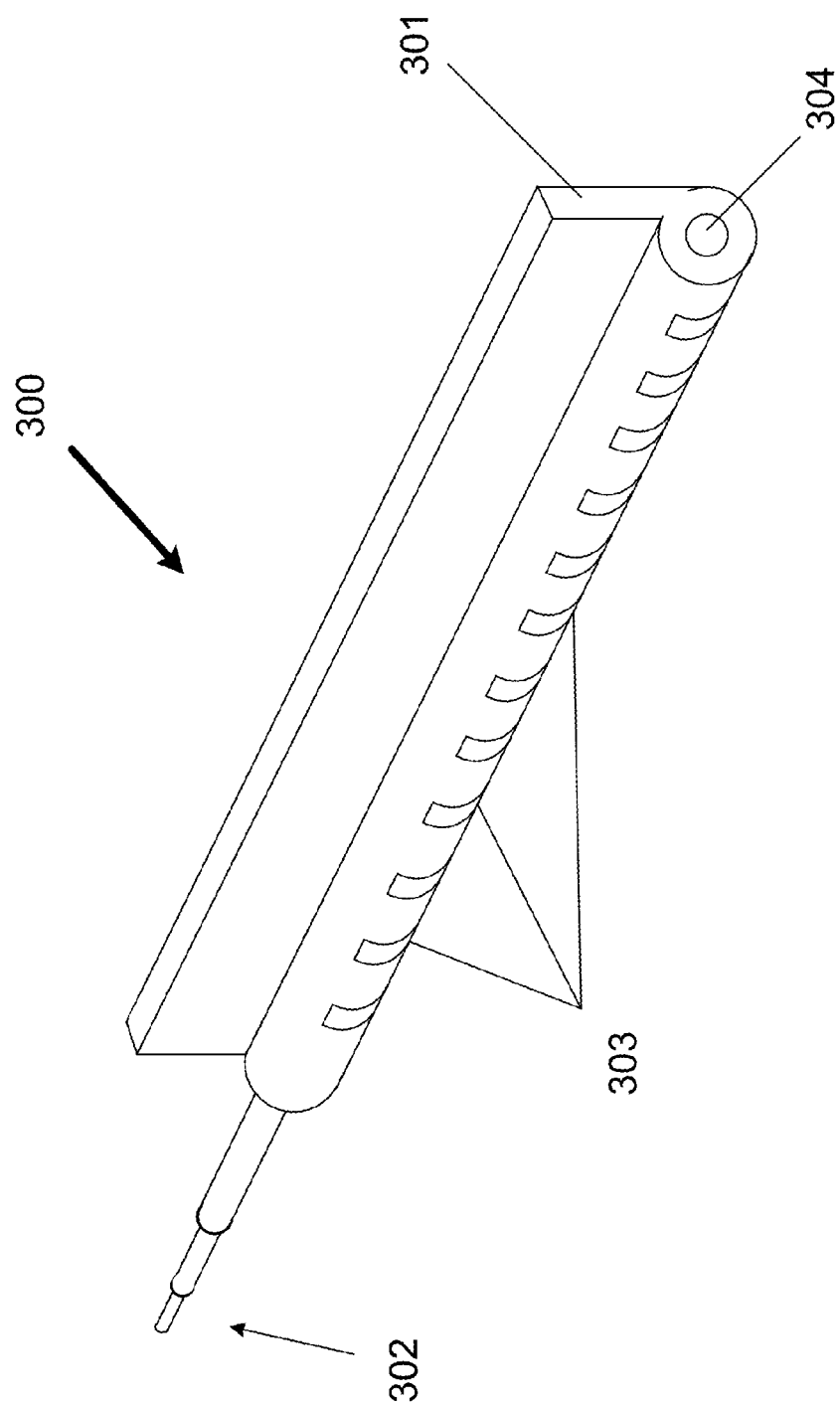
FIG. 4 is an oblique view of a P-line tubing assembly.

Referring to FIG. 4, water is delivered in one exemplary embodiment by means of P-line tubing assembly 300. The P-line 301 is an extruded, flexible PVC material of P-shaped cross section containing a central bore within the circular part of the P shape. The P-line 301 is notched at slits 303 spaced about ¼" apart with cuts that extend into the bore. Slits 303 communicate from the outside of the P-line 301 to the inside of the bore so that water entering the bore under pressure will leak out of the slits onto the filter pack 202. Holes or other forms of perforations may be used as an alternative to slits. One end of the bore contains water line connector 302 and the other end is stopped with plug 304. In an alternative embodiment, in lieu of a separate P-line tubing assembly, the water line itself extends across the top of the filter pack 202, and is perforated or notched along its length where proximate to the filter pack 202.

Figure 5:
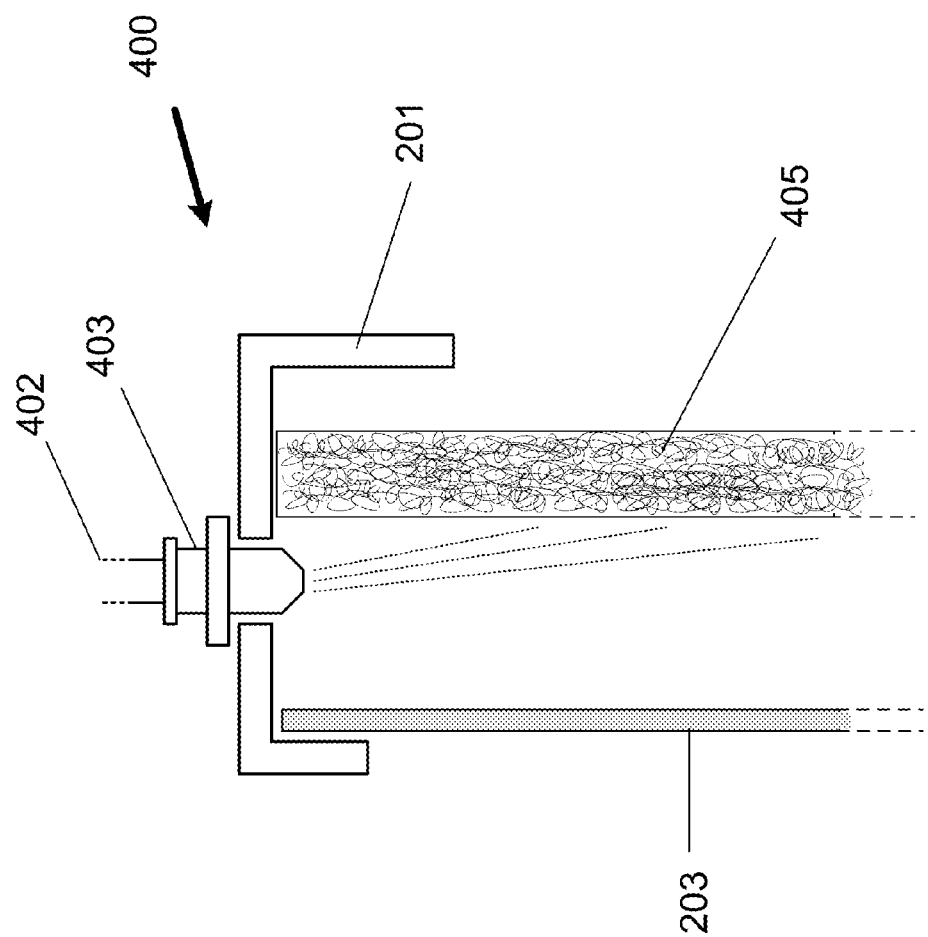
FIG. 5 is an oblique exploded view of a filter assembly with a mist spray nozzle.
Figure 6:
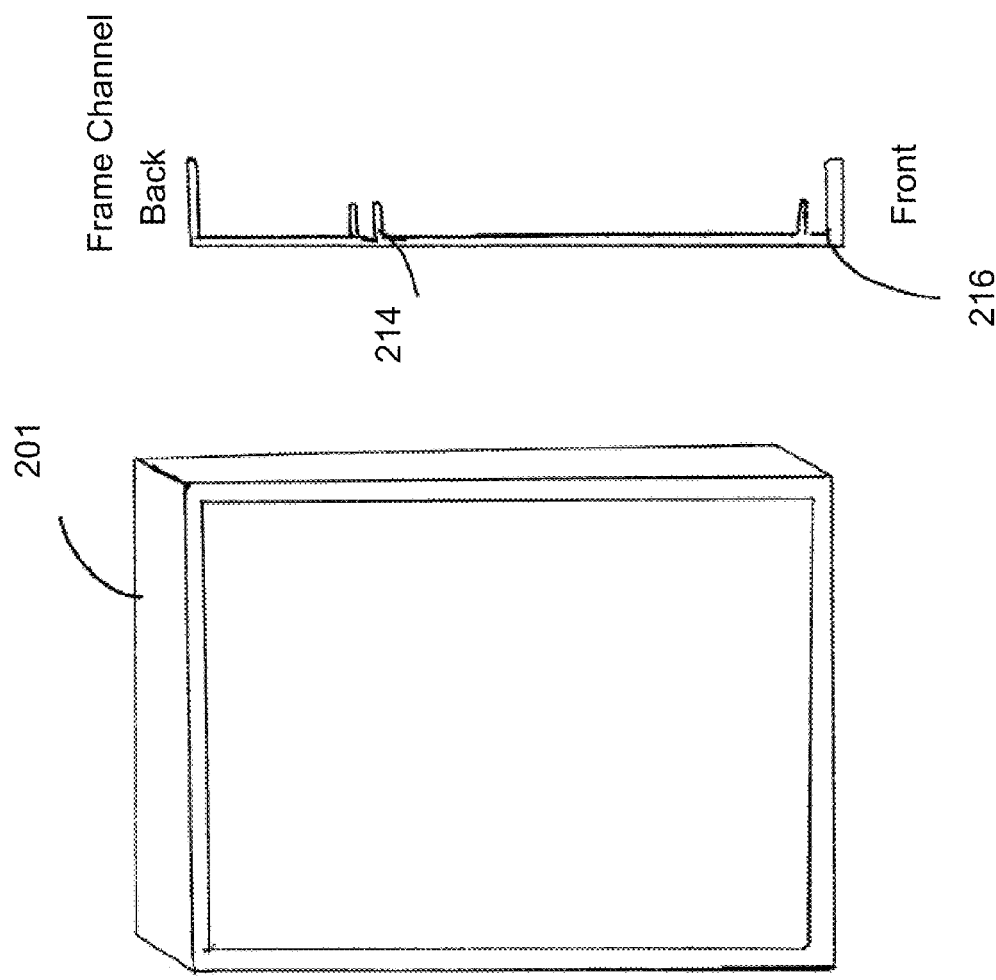
FIG. 6A is an oblique view of a filter frame.
FIG. 6B is a top cross-sectional view of one side of a filter frame.

Now, referring to FIGS. 5-10, an alternate embodiment of the spray filter apparatus 400 is shown in FIG. 5 wherein water delivery to filter pack or pad 405 is by means of water line 402 to mist spray nozzle 403. Water line 402 may be separate from or a part of the filter frame 201. At least one mist spray nozzle 403 is provided to deliver a controlled amount of water to the filter pack or pad 405. Dust screen 203 prevents dust and flying debris from entering the filter unit or the condenser, and may catch errant water or spray, which may contribute to the process by being pulled into the filter pack or pad 405.

Figure 7:
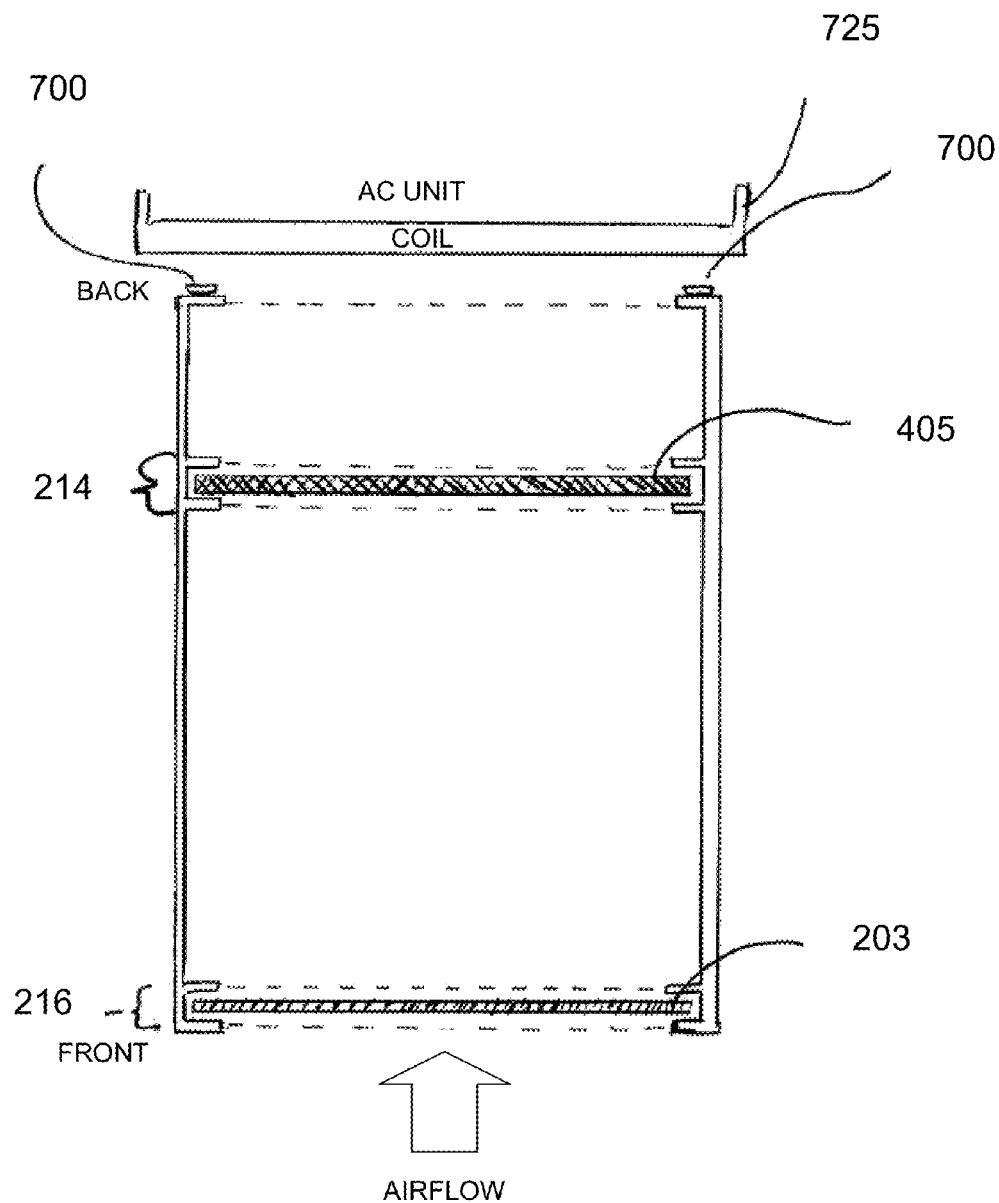
FIG. 7 is a cross-section taken in a horizontal plane showing the filter frame and air-conditioning unit.
Figures 8A, 8B:
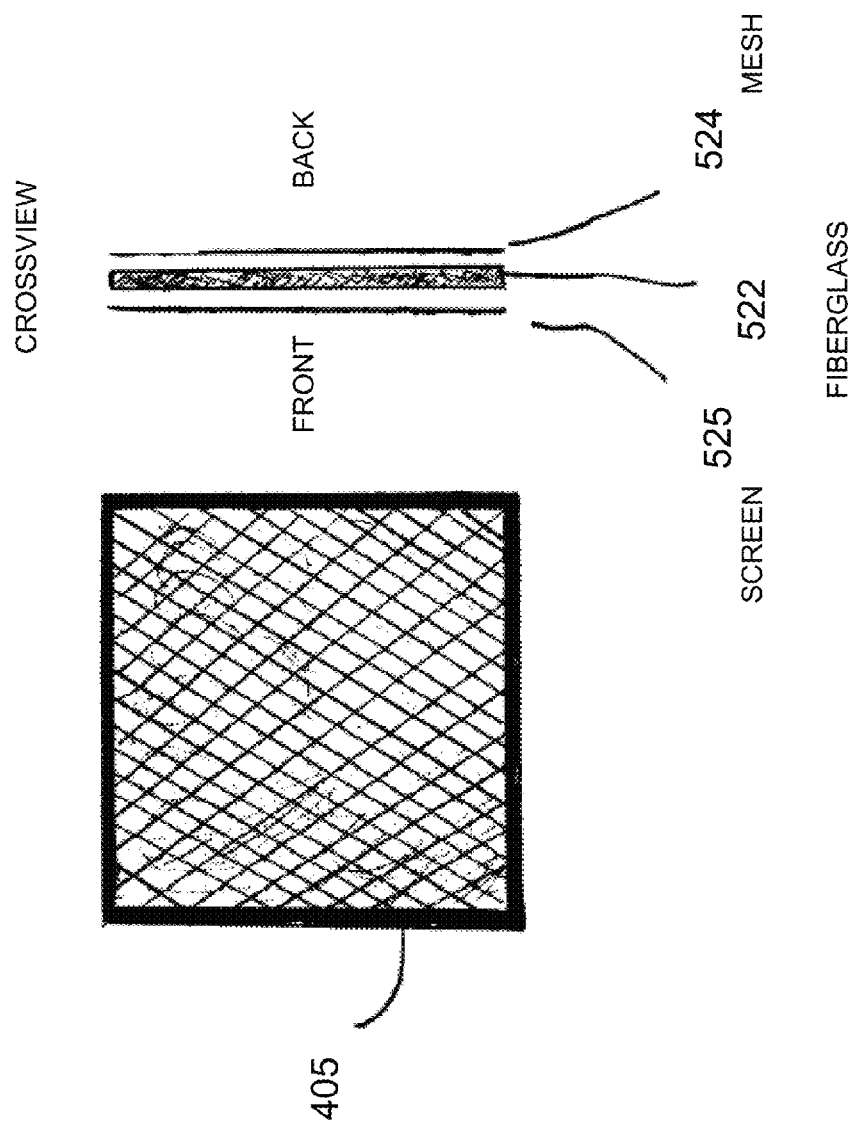
FIG. 8A is a front elevational view of the filter pad.
FIG. 8B is a side view of the filter pad.

Referring to FIGS. 6A and 6B, and FIG. 7, filter frame 201 can be any size depending on the air-conditioning unit size. FIG. 6A shows an embodiment in the form of a rectangular box, although other shapes and sizes can be used. In one embodiment, one or more drainage holes may be located in the bottom of the filter frame 201 to remove excess water that may collect in the bottom of the frame. The filter frame 201 includes frame channels to accommodate removable filter pad 405 and dust screen 203. Frame channel 214 is sized to reversibly hold filter pad 405 and frame channel 216 is sized to hold dust screen 203. As shown in FIG. 7 and FIG. 8B, the removable filter pad 405 in this embodiment comprises three layers, including a front screen 525, filter layer 522, and mesh layer 524.

Now, referring to FIG. 7, the filter frame 201 may include a means to attach the frame to the compressor/condenser unit 725. In the embodiments shown in FIG. 7, magnets 700 are affixed to the filter frame 700 and are used to removably attach the filter frame 201 to the compressor/condenser unit 725. Other means of attachment, including, but not limited to, screws, bolts, hooks, tabs, brackets, hangers, or adhesives, may be used.

Now, referring to FIGS. 8A and 8B, the filter pack or pad 405 is shown. The filter pad 405 comprises a screen 525 in the front, a filter layer 522 in the middle, and a mesh layer 524 in the back facing the A/C unit 725. The nozzle 403 provides water, which may be chilled, to the front of the filter pad 405.

Figure 9:
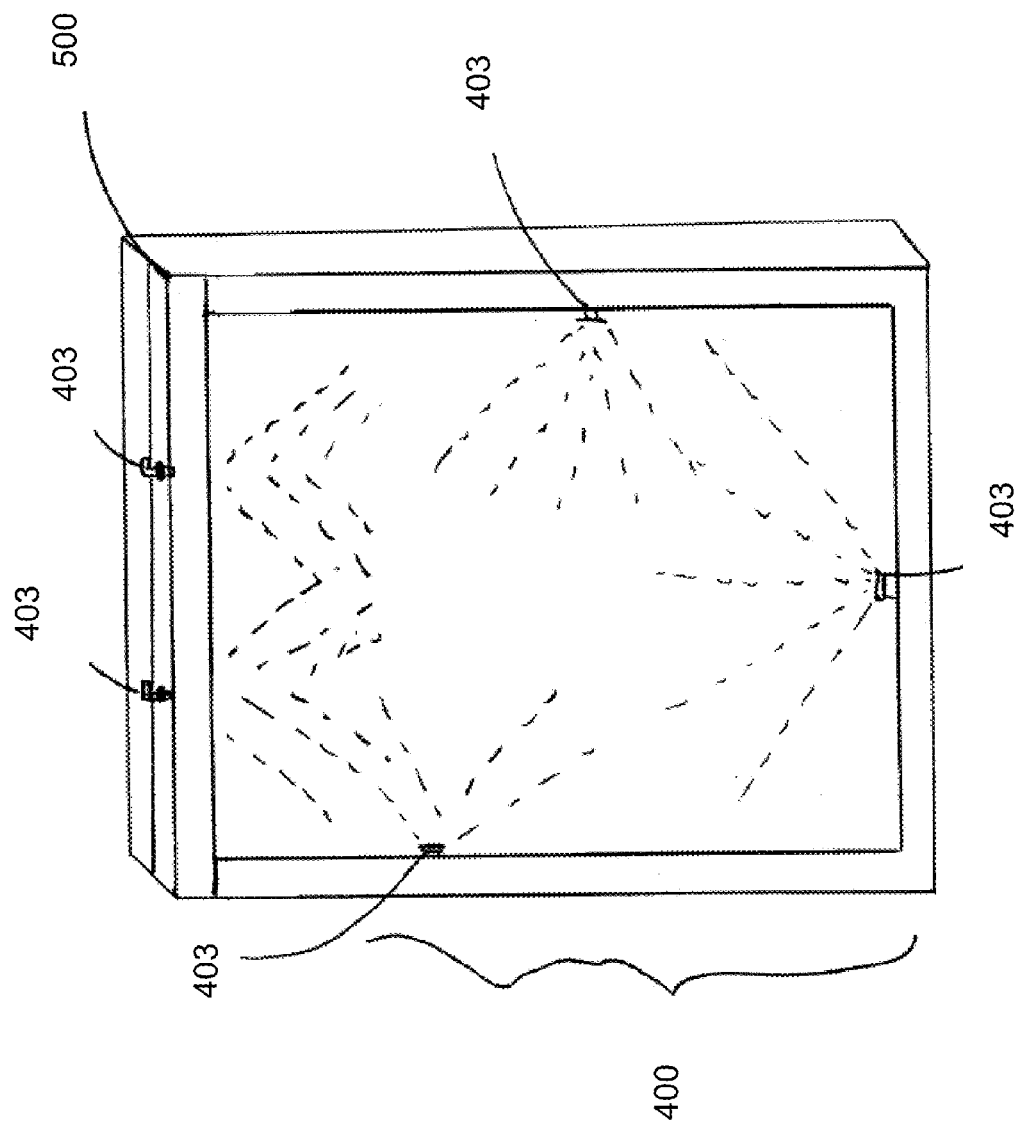
FIG. 9 is an oblique view of the filter apparatus in operation.

Referring to FIG. 9, an embodiment of a spray filter assembly 400 is shown. Depending on the size of the frame 201, the mist spray nozzle 403 placement on the inside of the filter frame is adjusted for best coverage. Some smaller frames may have one spray nozzle, while other larger frames may have multiple nozzles, including five or more mist spray nozzles 403. Preferably, the nozzle or nozzles 403 are arranged so as to provide complete, or substantially complete, wetting of the filter pad 405. The arrangement of nozzles 403 may vary depending on the size and shape of the frame. Nozzles may be placed on the top, sides, or bottom of the frame in various combinations. Nozzles may be operated together, or may be operated independently of each other. Nozzles may be fixed in place for a particular frame size, although in alternative embodiments, one or more of the nozzles may be adjustable in location. Nozzles may be fixed in size, or may be adjustable, so that different spray patterns or areas can be achieved with the same nozzle.

Figure 10:
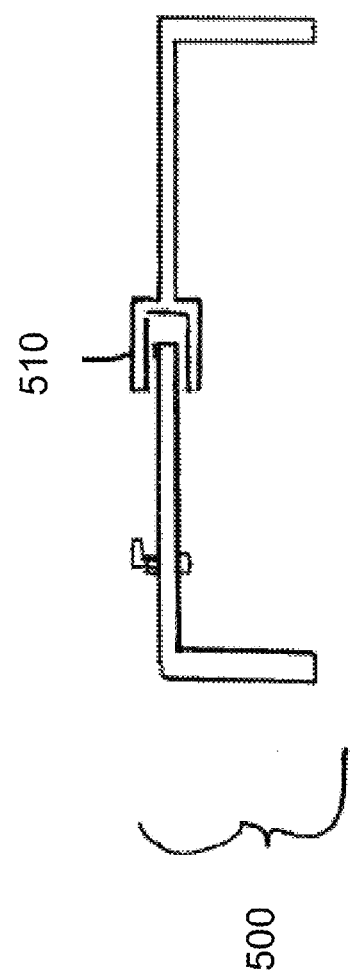
FIG. 10 is a cross-sectional view of the top of a filter frame.

Now, referring to FIG. 10, in one embodiment the top of the filter frame 201 comprises a top strip 500 that is removable in whole or in part. In this embodiment, the top comprises front and back parts where the back edge of the front part is inserted into a cavity or slot 510 in the front edge of the back part. The removable front part may be fastened to the frame by screws or other fastening means. Removal of the top, or as shown in this embodiment, the front part of the top, allows easy access to the interior of the filter frame, and removal and replacement of the dust screen 203, filter pack 405, and other components of the system.

Figure 13:
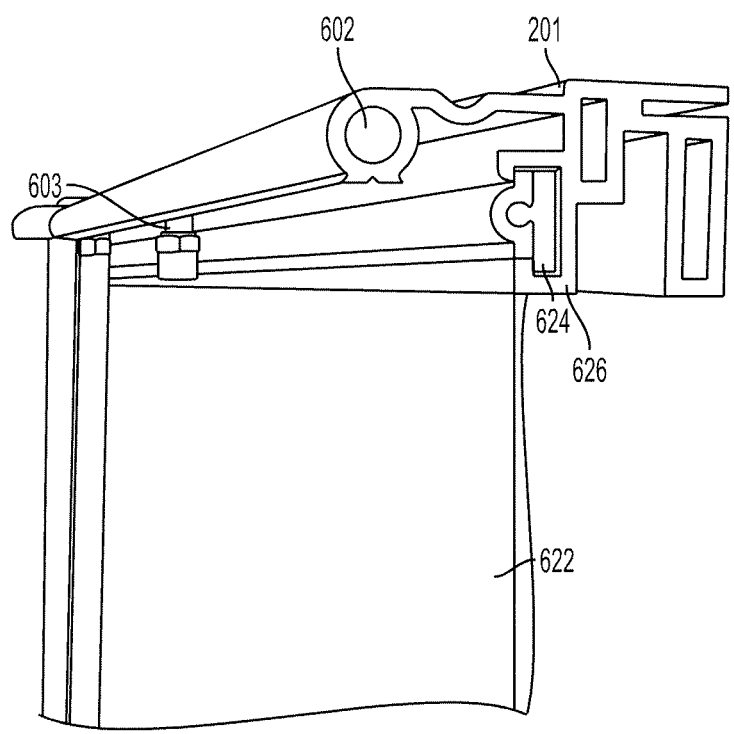
FIG. 13 is a cross-sectional view of the top of an alternative embodiment of a filter frame.
Figure 14:
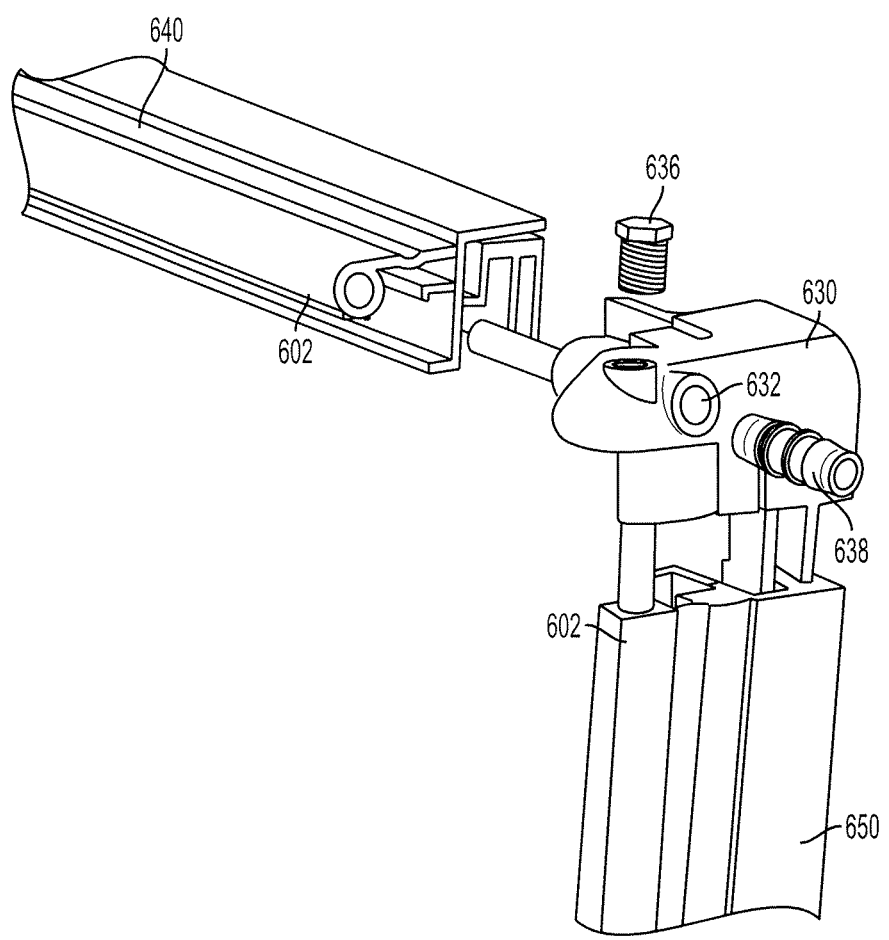
FIG. 14 is an exploded view of the upper-right corner of the filter frame of FIG. 13.

FIGS. 13-14 show details of another exemplary embodiment of a filter frame 201. FIG. 13 shows a cross-sectional view of the top of the filter frame, with the frame profile reduced to minimize frame width. In lieu of separate water lines, a water conduit 602 is built into the frame, with one or more nozzles 603 tapping into the conduit at desired locations. The filter 622 has a connecting piece 624 attached at the top and bottom that allow the filter to be rolled or snapped into corresponding slots or cavities 626 in the frame 201 for easier and quicker installation and removal. Similar connecting pieces are attached to the sides of the filter and snap into corresponding slots in the side of the frame. The connecting pieces may be soft and made of plastic, rubber, or other suitable material. The connecting pieces may extend for some or all of the length of the top, bottom, or sides, and may comprise multiple, smaller length pieces, even along a single side. The filter also may comprise one or more flat strips laminated to or otherwise attached to the filter media to provide resistance to billowing.

Figure 21:
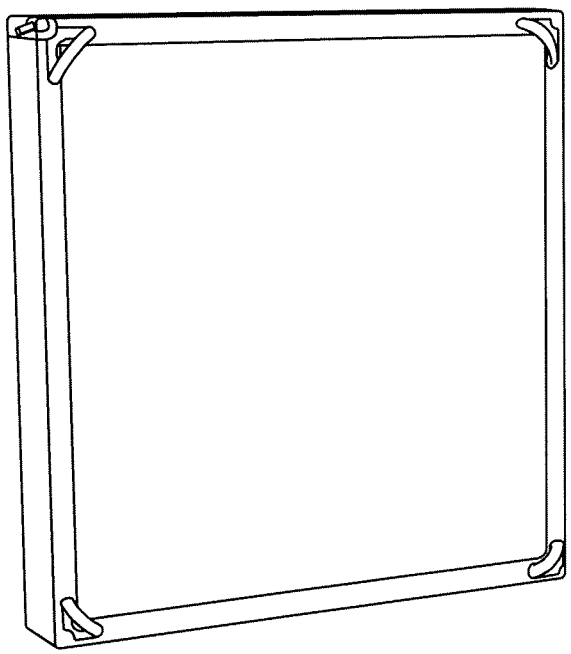
FIG. 21 is a front perspective view of a screen frame attached to a filter frame with front inlets.
Figure 22:
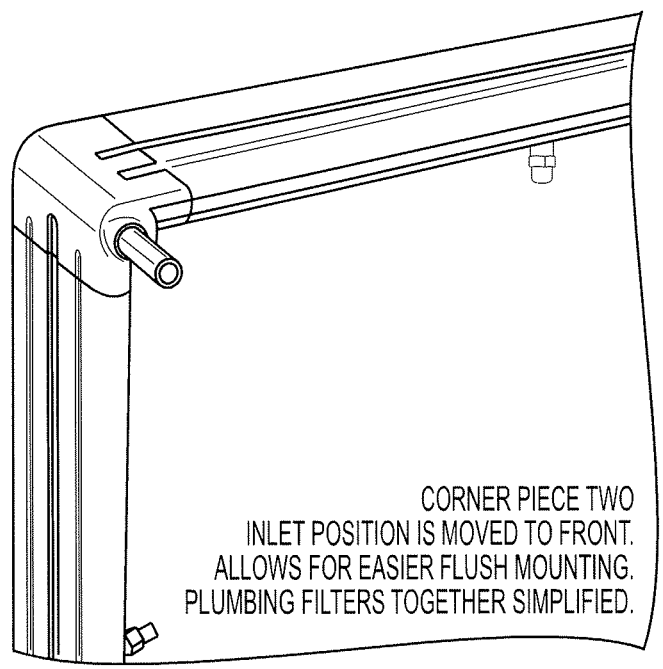
FIG. 22 is a perspective view of the upper-left corner of a filter frame with front inlets.
Figure 23:
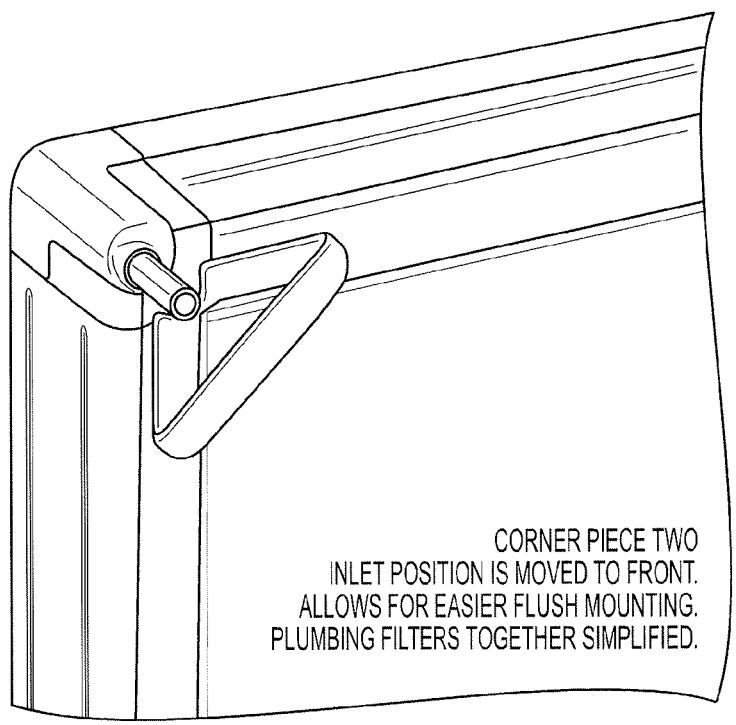
FIG. 23 is a perspective view of the upper-left corner of a filter frame with front inlets with screen frame attached.
Figure 24:
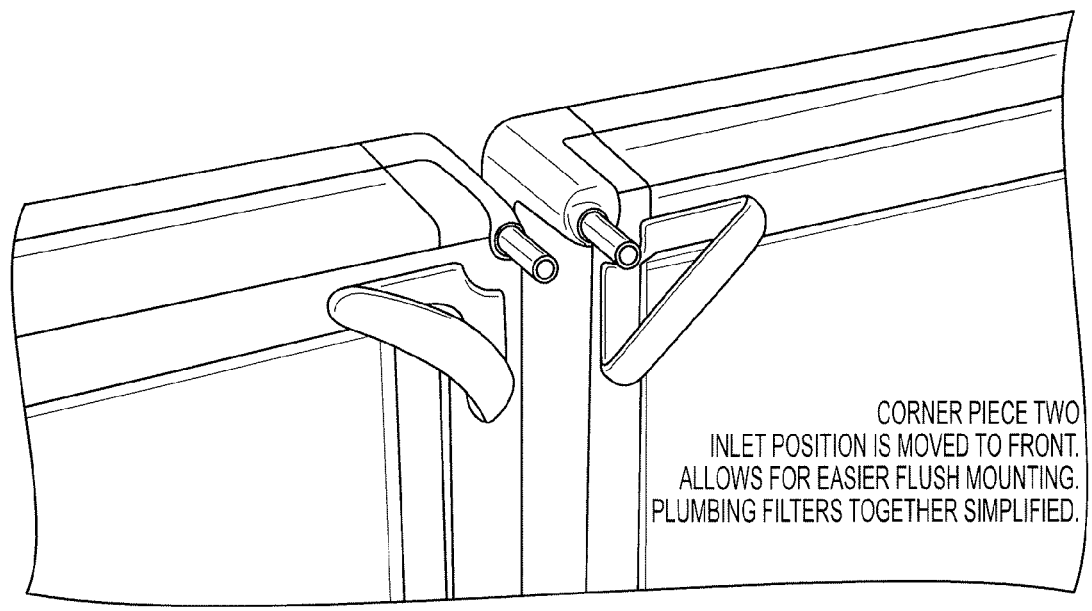
FIG. 24 is a front perspective view of two corners of adjacent filter frames.

FIG. 14 shows a corner piece 630 for a filter frame used to connect a top frame piece 640 with a right side frame piece 650. The corner piece can be removably attached to one or both frame pieces, such as by snapping into place, or may be glued, welded, screwed, bolted or otherwise permanently (or semi-permanently) connected. In this embodiment, the corner pieces have offset inlets 632 corresponding to the water conduits 602 in the frame pieces. The inlets may accept plugs 636 or a hose connector 638 for connection to a water line. The inside of the inlets may be threaded for plugs or hose connectors to be screwed into place, although others forms of attachment may be used. Plugs and hose connectors of different sizes also may be used. As seen in FIGS. 20-22, the water inlets may be side-mounted (i.e., extend out to the sides of the frame), or front-mounted (i.e., extend out from the front of the frame). The latter configuration allows for easier flush mounting of the filter frame, and plumbing multiple filters together is simplified (see FIG. 24).

Figure 15:
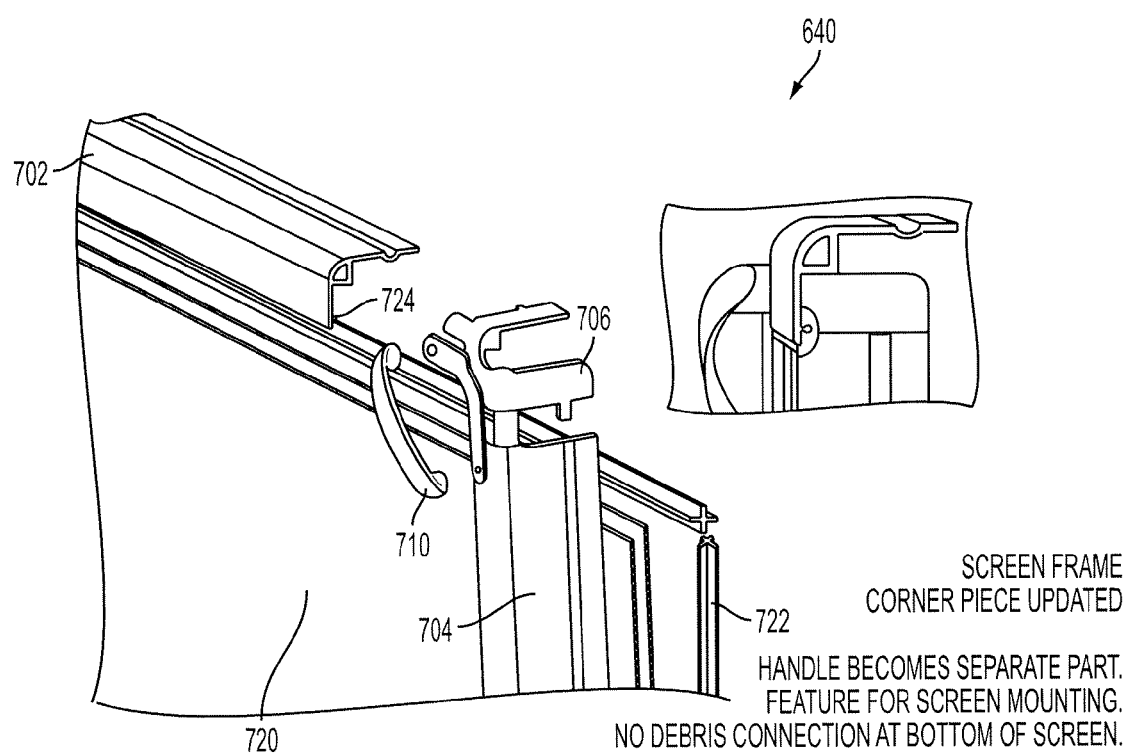
FIG. 15 is an exploded view of the upper-right corner of an embodiment of a screen frame.

FIG. 15 shows an exploded view of the upper right corner of an embodiment of a screen frame 701, comprising a top piece 702 and a right side piece 704 connected by a corner piece 706. The corner piece 706 can be removably attached to one or both screen frame pieces, such as by snapping into place, or may be glued, welded, screwed, bolted or otherwise permanently (or semi-permanently) attached. A handle 710 may be separately attached, as shown. The screen 720 is mounted to the frame in this embodiment by a number of connectors 722 that slide or snap over a rounded protrusion 724 on the inside of the screen frame pieces.

Figure 16A:
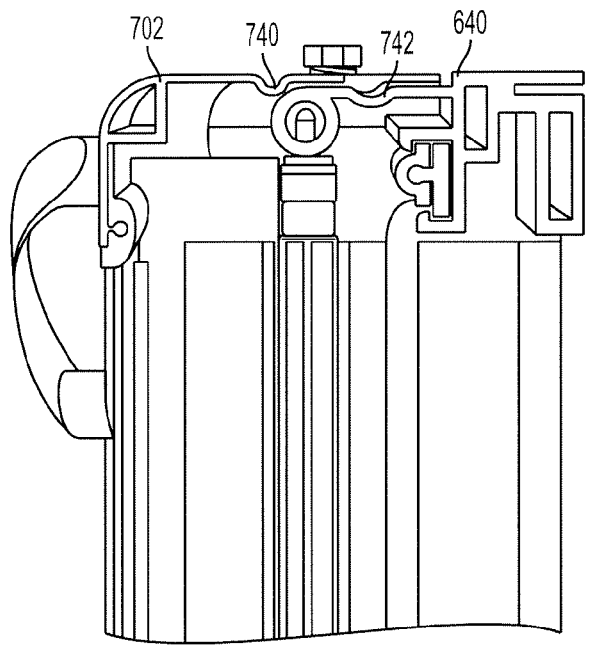
FIG. 16A is a cross-sectional view of the top of a screen frame in position to be attached to a filter frame.
Figure 16B:
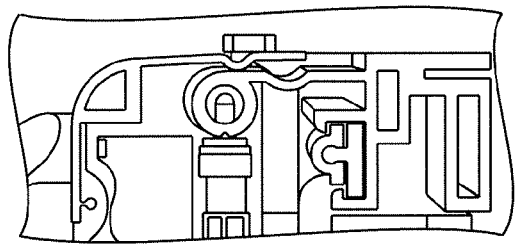
FIG. 16B is a cross-sectional view of the top of a screen frame being attached to a filter frame.
Figure 16C:
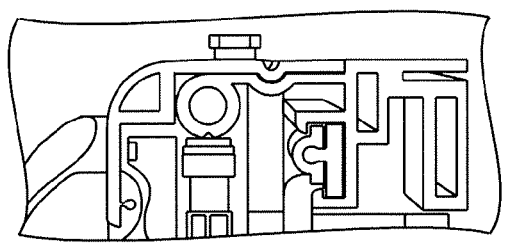
FIG. 16C is a cross-sectional view of the top of a screen frame attached to a filter frame.
Figure 17:
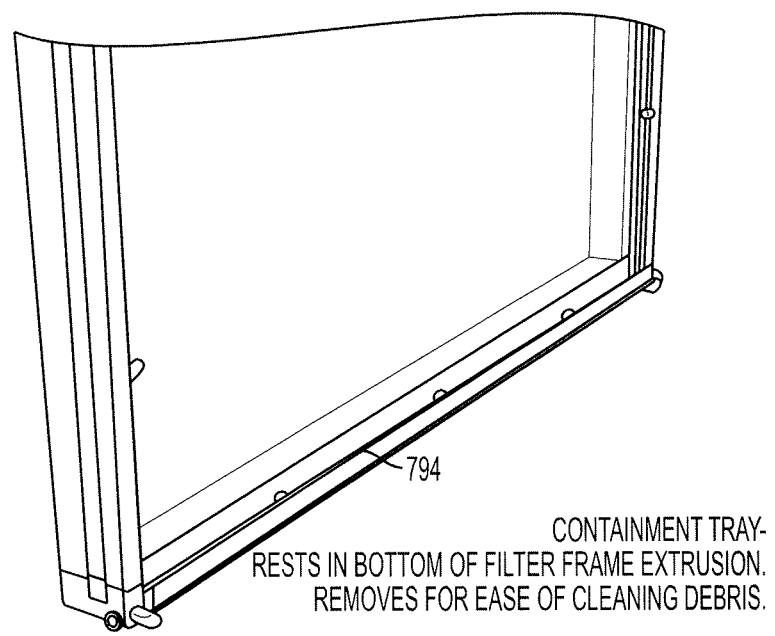
FIG. 17 is a perspective view of a containment tray.

FIG. 16 shows a cross-sectional view of how one embodiment of a screen frame attaches to a filter frame. FIG. 16A shows the top piece of the screen frame 702 in position to be pushed onto and attached to the filter frame 640. FIG. 16B shows the screen frame mid-way through the process, and FIG. 16C shows the process being completed as a protrusion 740 on the inside of the screen frame snaps into an indentation 742 in the outside of the filter frame. FIG. 17 shows a containment tray 794 that can be inserted into the bottom of the filter frame to collect fluid and debris.

Figure 18:
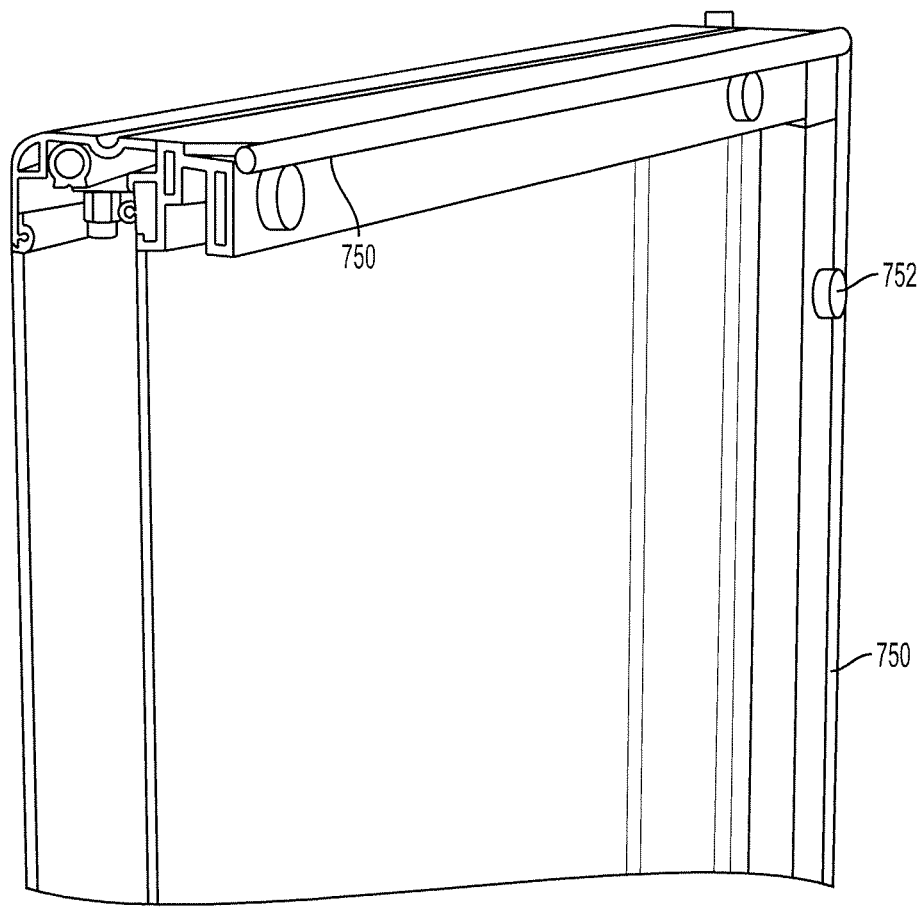
FIG. 18 is a back view of a filter frame with sealing gasket.
Figure 19:
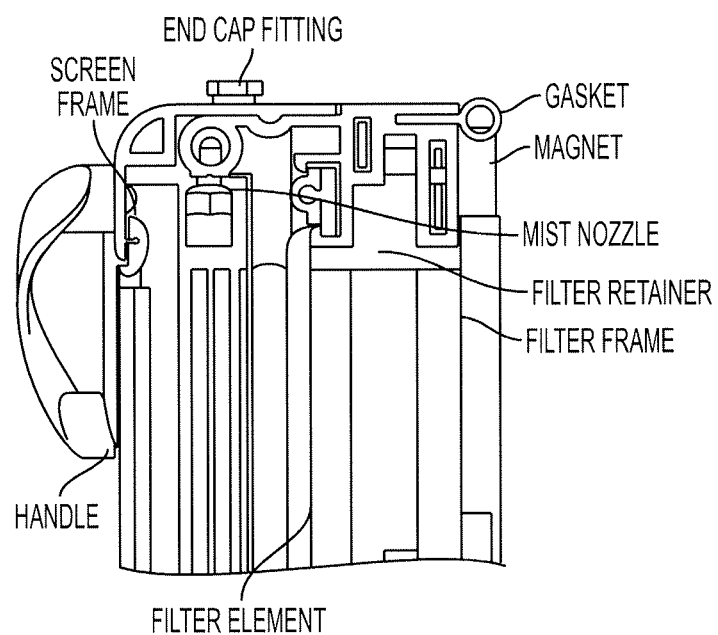
FIG. 19 is a cross-sectional view of a screen frame attached to a filter frame.
Figure 25:
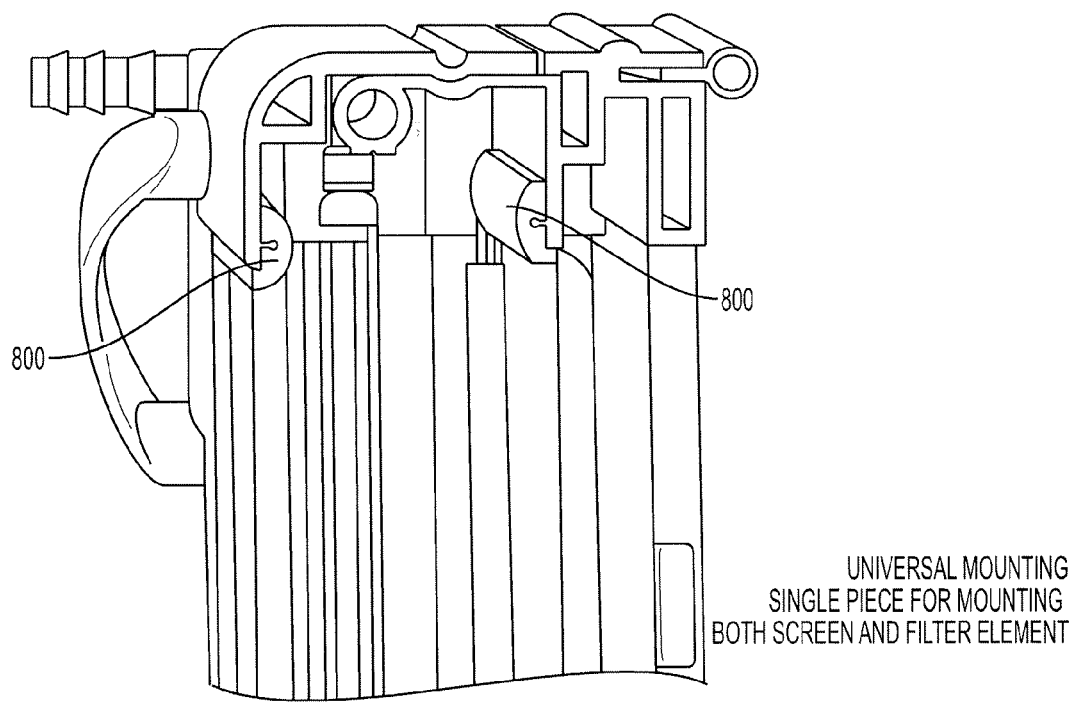
FIG. 25 is a cross-sectional view of a screen frame attached to a filter frame with a universal mounting element for both screen and filter.

FIG. 18 shows a view of the back of a filter frame with a sealing gasket or grommet 750. The gasket 750 can be of any suitable shape or material, including but not limited to rubber, foam, plastic, or the like, and may be attached to the back of the filter frame in a variety of ways. In the embodiment shown, the gasket comprises a tube with a fin that is inserted into a slot on the back of the filter frame. Magnets 752 may be used to attached the filter frame to the air compressor or condenser unit, although other means of attachment known in the art are possible. FIG. 19 shows a cross-sectional view of the top of an assembled unit comprising a screen frame connected to a filter frame. FIG. 25 shows a cross-sectional view of an alternative embodiment, with the same type (i.e., universal) connector piece 800 being used for mounting both the screen and filter.

FIGS. 26-29 show yet another embodiment of a frame assembly 900 with a filter frame and screen frame. FIGS. 26A and 26B show front and top views of the assembly 900, which is a square in this embodiment, but can be any other suitable shape. Handles 710 may be located on the front of the assembly. As seen in the cross-sectional views in FIGS. 26C and 26D, the screen frame 701 has been connected to the filter frame 201 in the manner described above (i.e., a protrusion 740 on the inside of the screen frame snaps into an indentation 742 in the outside of the filter frame). In one embodiment, as seen in FIGS. 28A-D and 30, the protrusion 740 is found only on the inside of the screen frame corner piece 706, and not in the top or similar pieces 702 of the screen frame. This configuration may make removal of the screen frame from the assembly easier.

As seen in FIGS. 27A-E and 28A-E, the screen frame corner piece 706 has an opening that allows the water inlets 635a, 635b on the corresponding filter frame corner piece 630 to be exposed. The embodiment shown in the figures shows a dual water inlet, with a front inlet 635a and a side diagonal inlet 635b, which can be plugged off or connected with a water supply or with other frame assembles as desired. As noted above, the inlets may be configured in any appropriate direction.

Figure 26A:
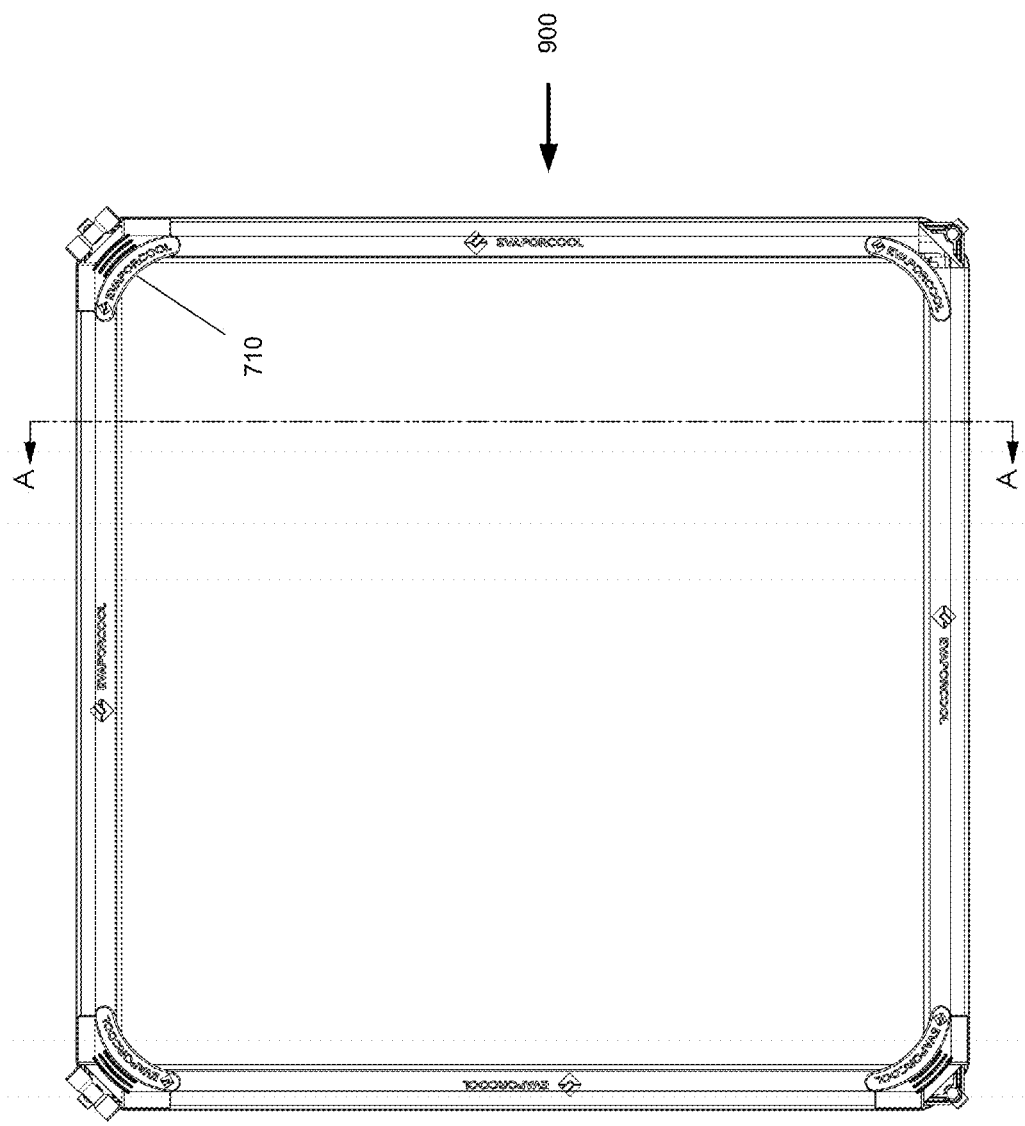
FIG. 26A is a front view of an alternative embodiment of a screen and filter frame assembly.
Figure 26B:
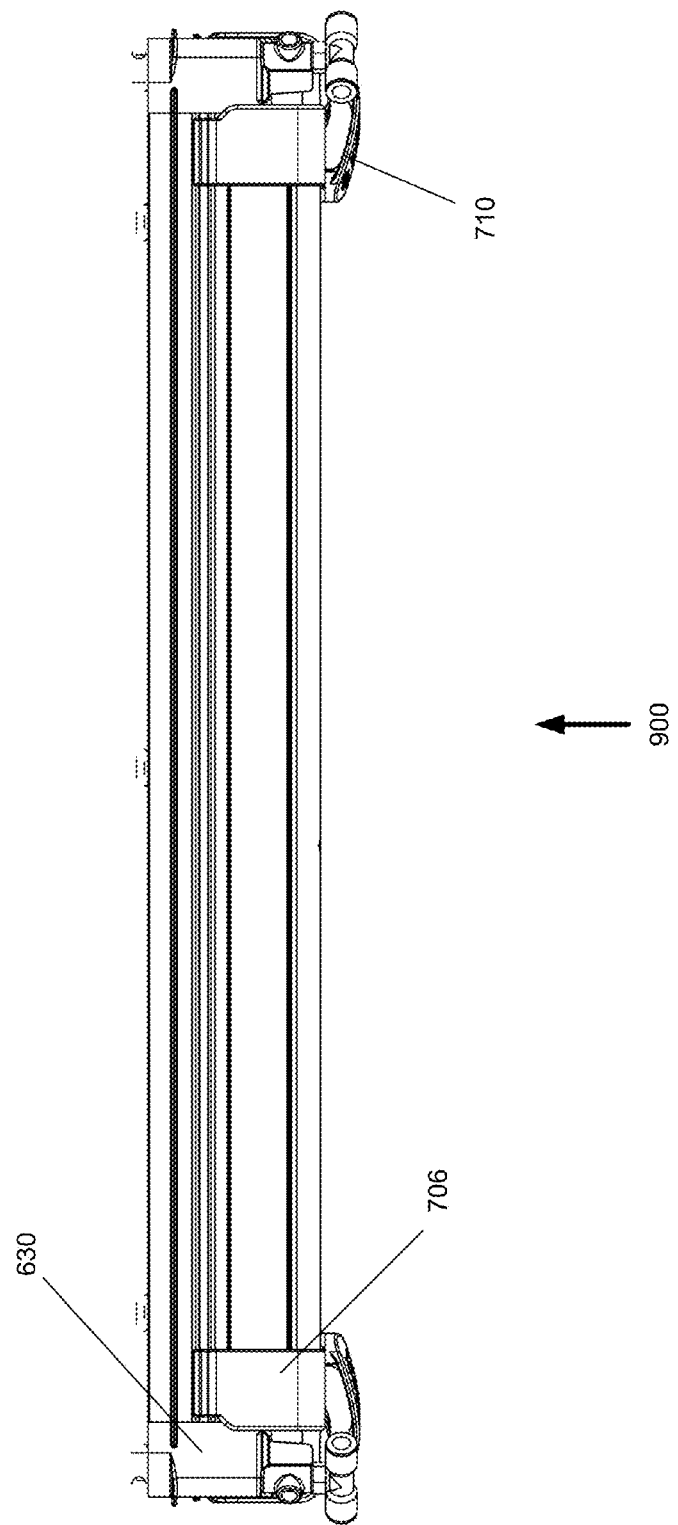
FIG. 26B is a top view of the frame assembly of FIG. 26A.
Figure 26C:
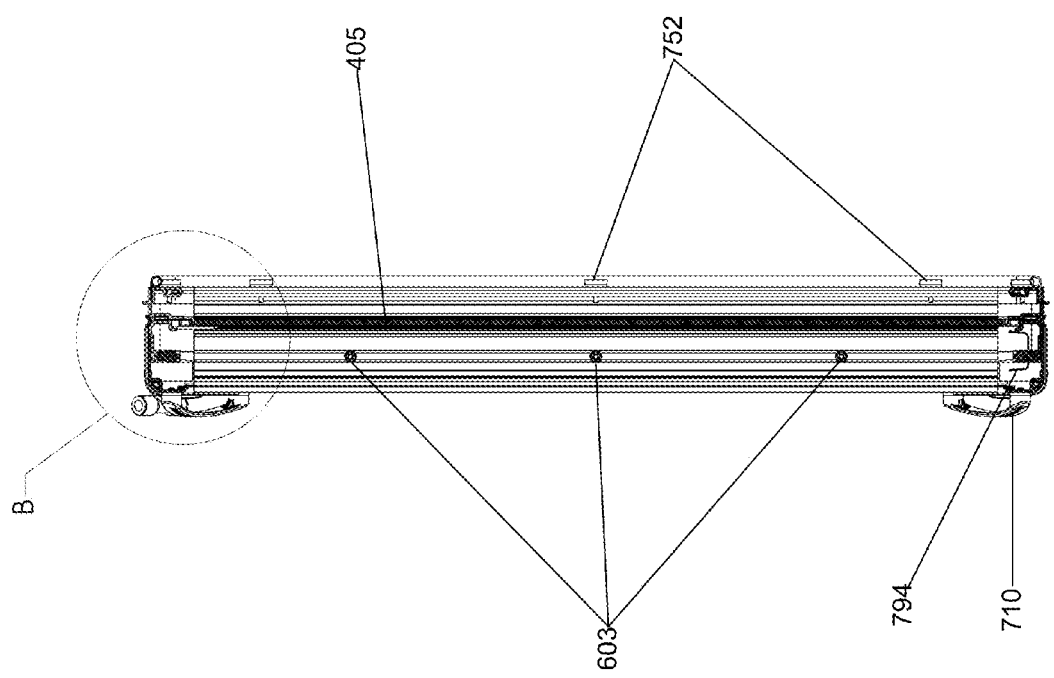
FIG. 26C is cross-section of the frame assembly of FIG. 26A along A-A.
Figure 26D:
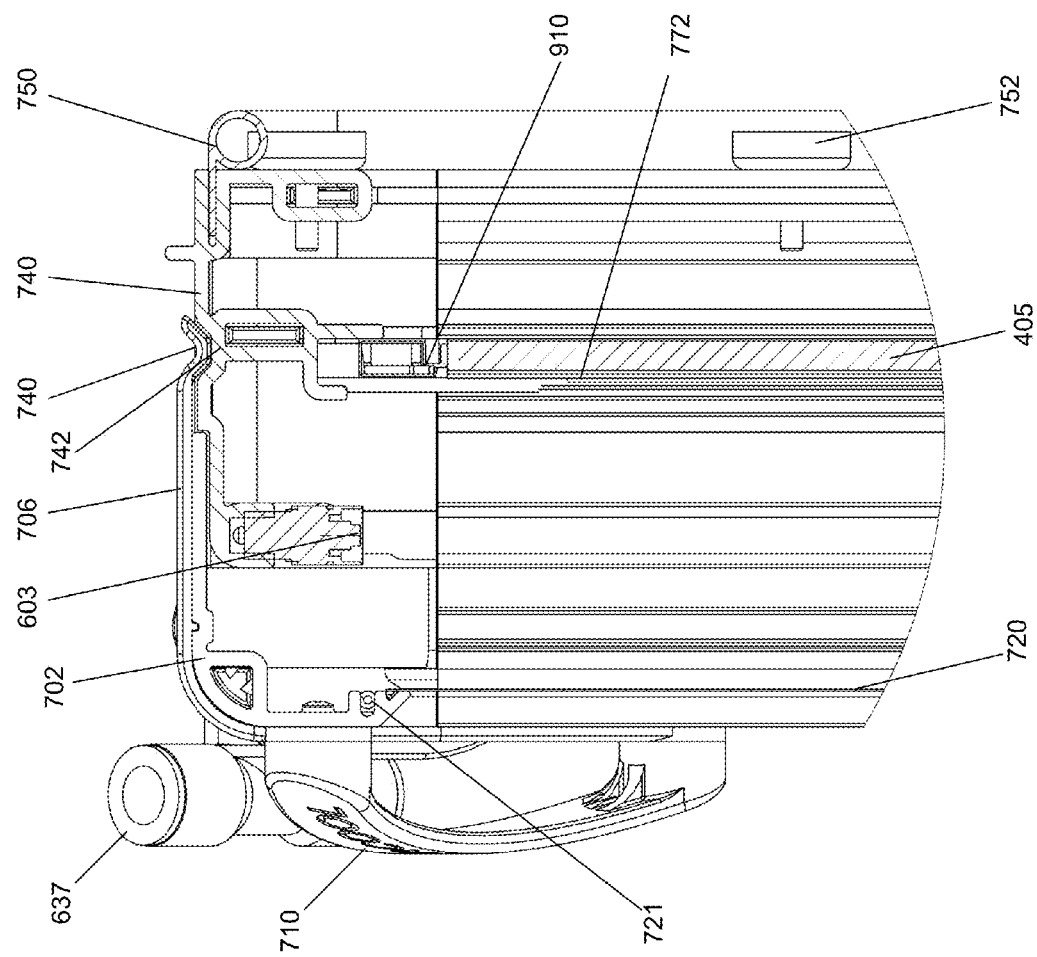
FIG. 26D is a detailed cross-section of the top of the frame assembly of FIG. 26C.
Figure 27A:
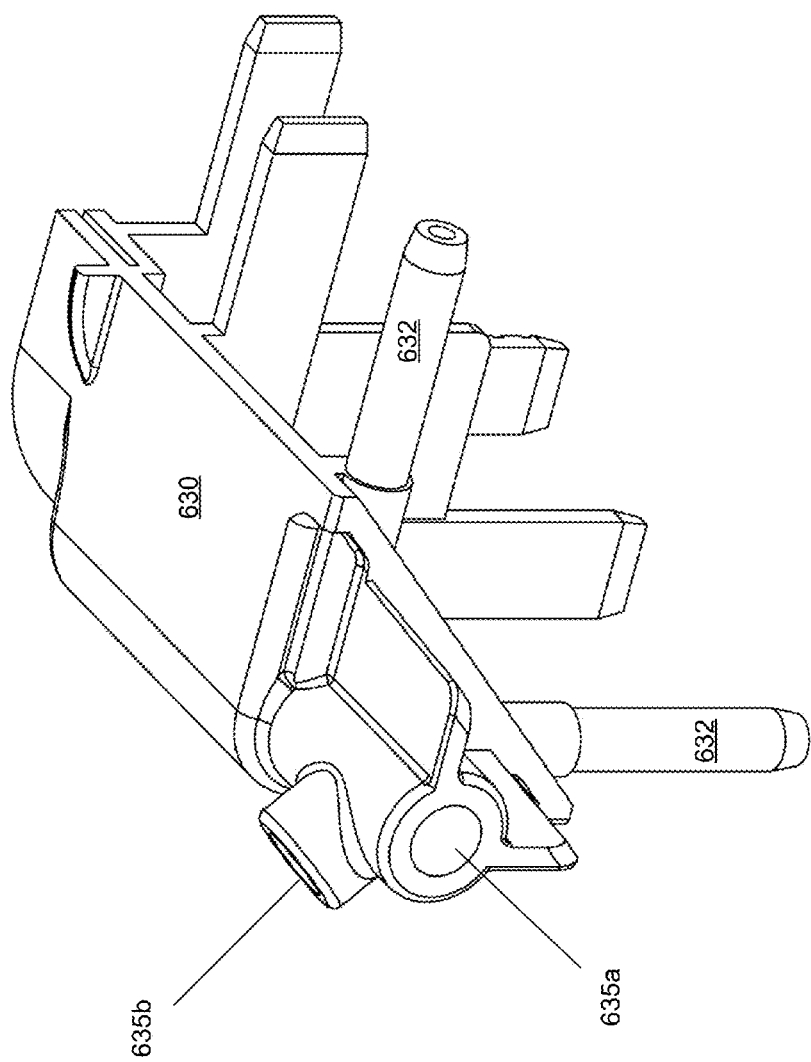
FIG. 27A is a perspective view of a top corner of a filter frame of the frame assembly of FIG. 26A.
Figure 27B:
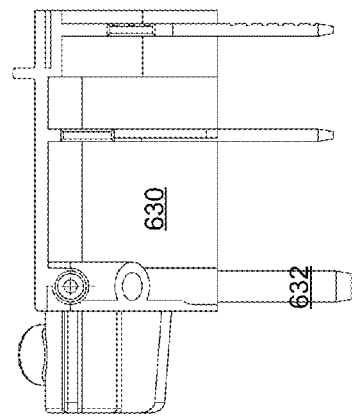
FIGS. 27B-E are different views of the filter frame corner of FIG. 27A.
Figure 27C:
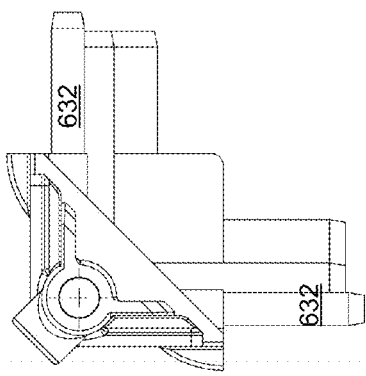
Figure 27D:
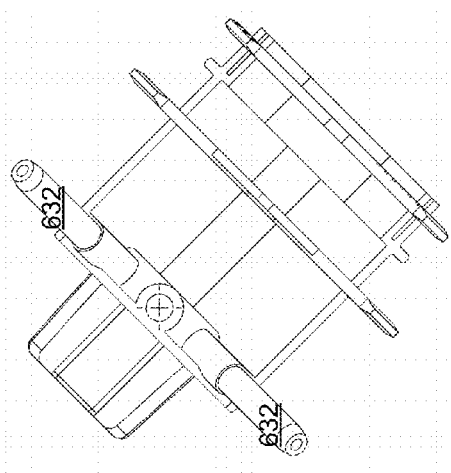
Figure 27E:
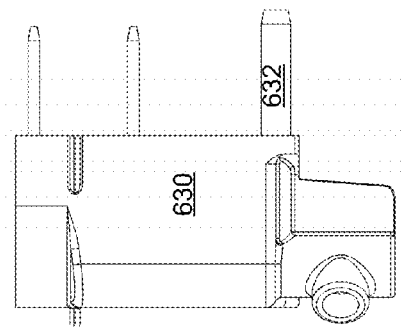
Figure 28A:
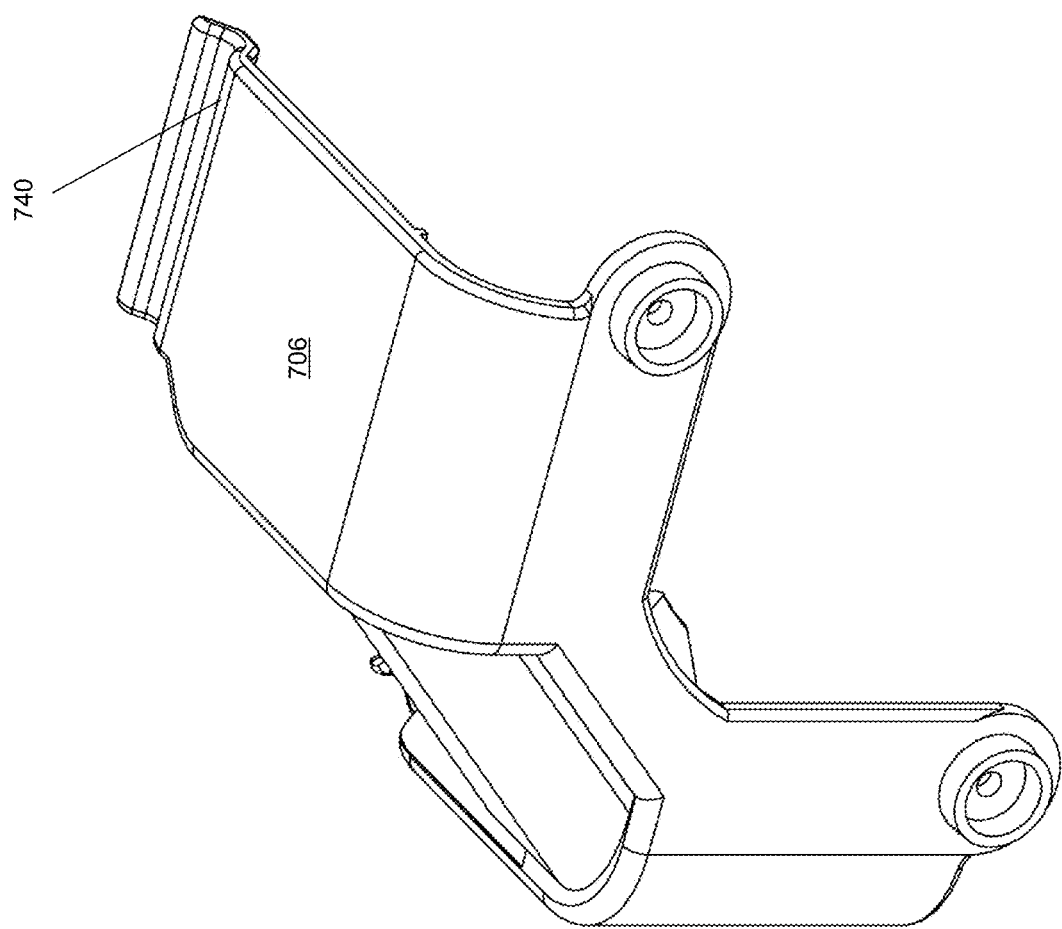
FIG. 28A is a perspective view of a top corner of a screen frame of the frame assembly of FIG. 26A.
Figure 28B:
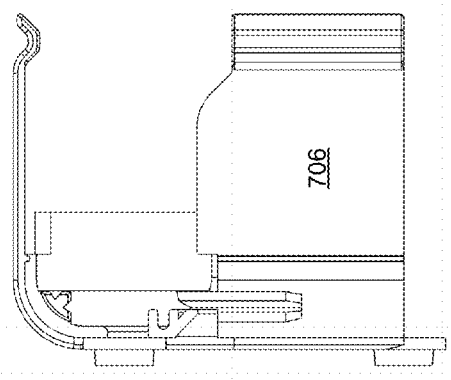
FIGS. 28B-E are different views of the screen frame corner of FIG. 28A.
Figure 28D:
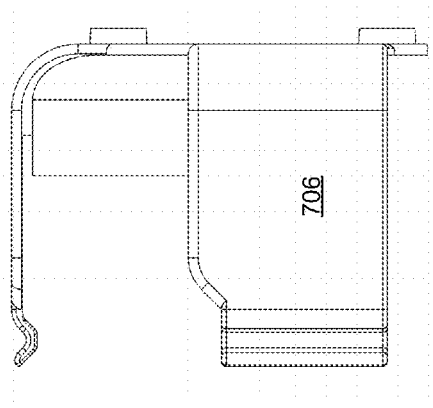
Figure 28C:
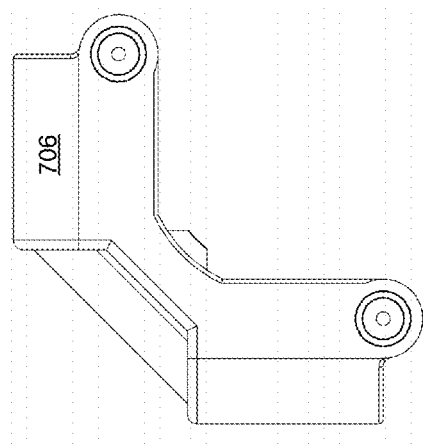
Figure 28E:
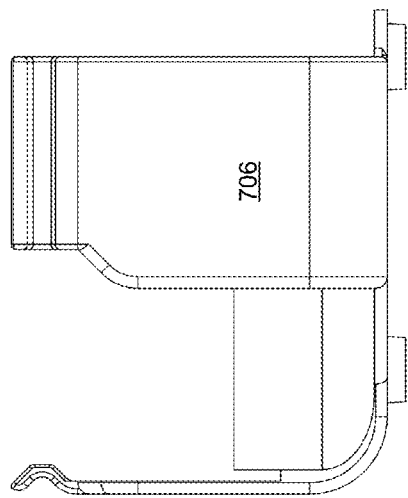
Figure 29:
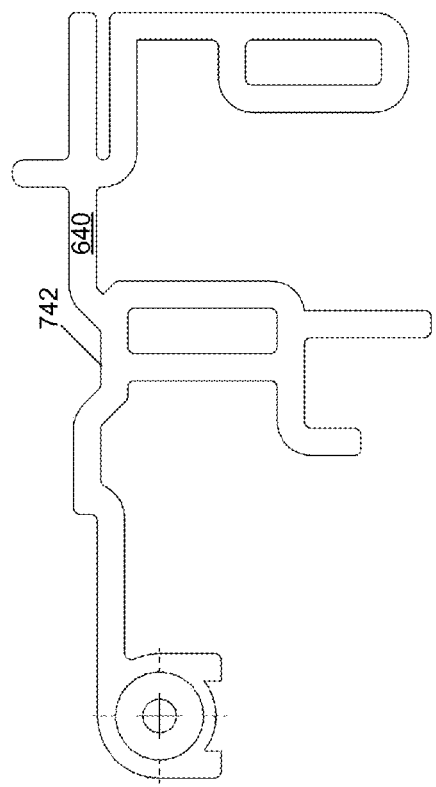
FIG. 29 is a cross-section of the top of the filter frame of the frame assembly of FIG. 26A.
Figure 30:
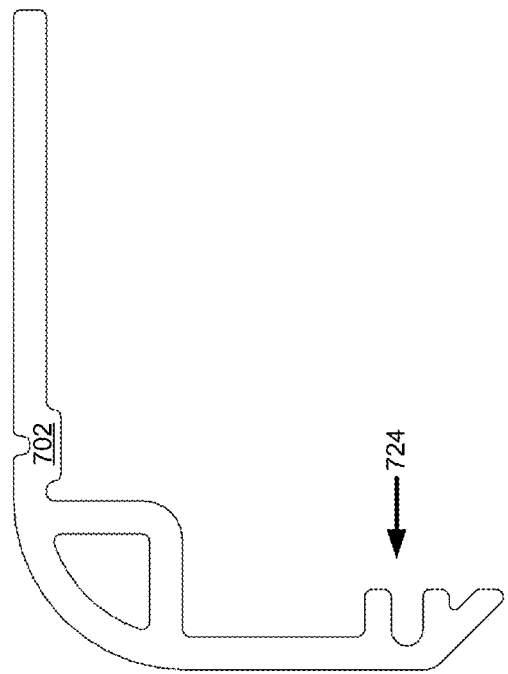
FIG. 30 is a cross-section of the top of the screen frame of the frame assembly of FIG. 26A.
Figure 32:
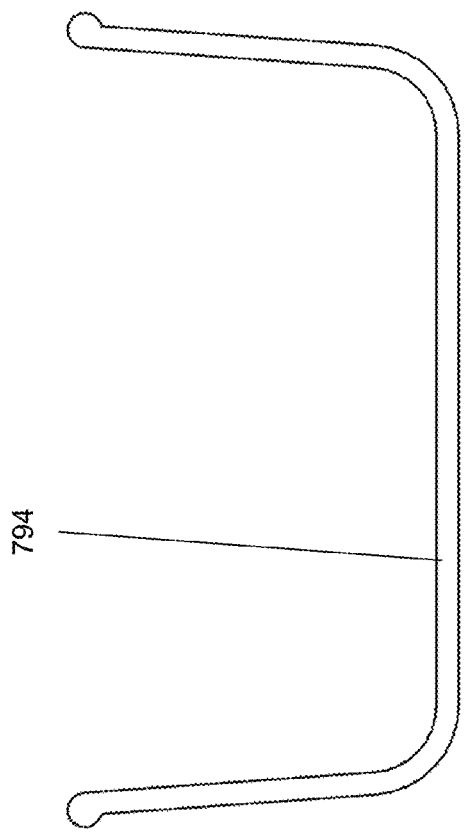
FIG. 32 is a cross section of a containment tray.
Figure 31:
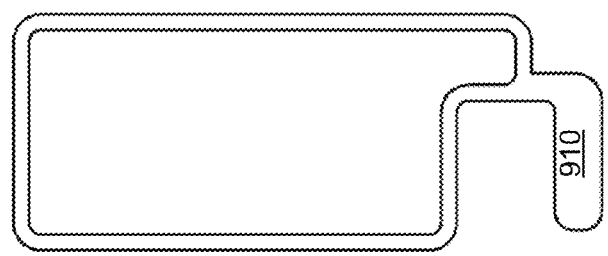
FIG. 31 is a cross section of a rail component of the filter frame of the frame assembly of FIG. 26A.

In some embodiments, as seen in FIGS. 26D and 31, a filter frame rail 910 may be used to stiffen or strengthen the filter frame and frame assembly. As described above, containment tray 794 can be inserted into the bottom of the assembly to collect fluid and debris.

In one exemplary embodiment, the method to control the delivery of water, which may be chilled, to an air conditioning coil or air compressor involves mounting a filter apparatus 112 to the exterior of the unit; normally this is on the outside of the condenser and is upstream in the airflow being forced through the condenser unit. The filter apparatus 112 or spray filter apparatus 400 is attached to the condenser outer surface (air intake side), and preferably covers all of the exposed condenser surface in order to prevent any untreated air entering the condenser. Sealing gaskets may be used, as described above, or other methods and/or materials as needed to cover areas to prohibit air intake. Multiple filter units may be used to cover the needed area.

In operation, the filter apparatus 112 or spray filter apparatus 400 is wetted sufficiently to provide available moisture to evaporate in the incoming air stream and impact the condenser array. The incoming air passing through the filter apparatus 112 or spray filter apparatus 400 is forced by means of the condenser draft fan 105. As the air passes through the wetted filter apparatus 112 or spray filter apparatus 400, two things take place. First, it is essentially cleaned of dust; and second, it is cooled by evaporation.

Thus, in one embodiment, the mist system uses water directly from municipal water sources or other sources, turns its flow on and off by means of a solenoid valve, directs the mist spray to the filter pad 405 by means of one or more mist spray nozzles 403, and controls the water delivery timing by means of an electronic control system. In some embodiments, the water may be treated and/or pressurized before being introduced into the system. Ambient air temperature, condenser liquid line temperature, relative humidity and electric current sensors are provided to the control system so that mist spray is delivered when conditions are deemed appropriate.

Figure 11:
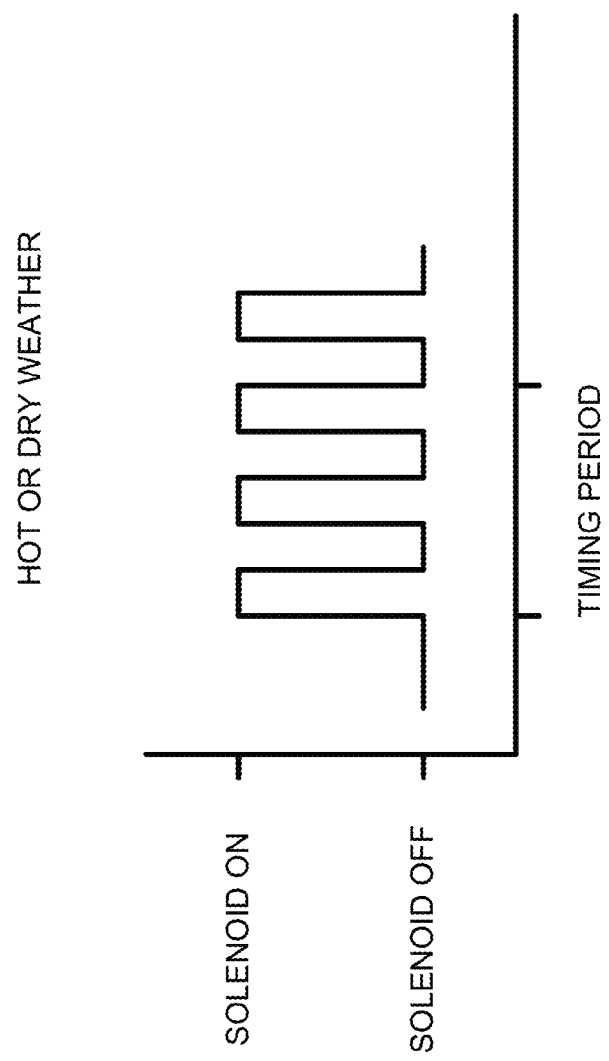
FIG. 11 is a diagram illustrating the timing of electrical pulses which control water flow for hot or dry weather.

The above-described filter assembly 112 or spray filter assemblies can be managed by a control system. More specifically, reference to FIG. 11 shows a timing diagram which illustrates the pulse frequency suitable for hot or dry weather, namely several pulses for a timing period. In contrast, FIG. 12 shows a timing diagram illustrating the pulse frequency adjusted for cool or humid weather wherein less water is delivered to the filter apparatus since less cooling is required by the system or humidity conditions limit the amount of water needed in that weather condition.

In one embodiment, the control circuit comprises a microcontroller device which contains programming that receives input, including but not limited to, outside ambient air temperature, condenser liquid line temperature, relative humidity and electric current, and uses said input to provide a stepwise level of control ("solenoid open time") of water delivery commensurate with outside air temperature and relative humidity. As the outside air temperature or relative humidity changes, the amount of "solenoid open time" of the water solenoid valve is increased or decreased respectively by using data contained in the programming. Such data may be stored in a look-up table of outside air temperature vs. solenoid open time. Thus, in one exemplary embodiment, the water delivery system would remain off when outside air temperature is below a preset value (80° F., for example), regardless of whether the A/C system is running, to prevent undesired operation.

Figure 12:
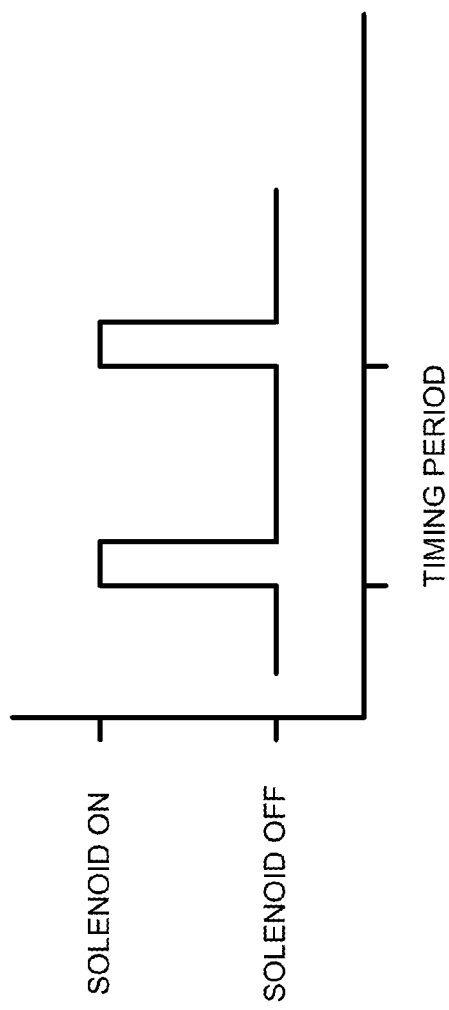
FIG. 12 is a diagram illustrating the timing of electrical pulses which control water flow for cool or humid weather.

The pulsed delivery of water is illustrated in FIGS. 11 and 12. The Y-axis shows only two positions, on or off, for the solenoid valve. The X-axis shows the passage of time, and a defined interval between two successive tick marks which contains a number of complete cycles. In FIG. 11 the time interval is shown for hot or dry weather with, say, three on-off cycles for the solenoid valve. FIG. 12 shows the timing diagram for cool or damp weather which contains only, say, one cycle of on-off for the solenoid valve. Therefore, for hot or dry weather more water is delivered to the filter assembly, and for cool or humid weather less water is delivered as less cooling is required under those circumstances.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

We claim:

1. A cooling system located within an airstream, comprising:
   a filter frame with sides and an open center;
   a screen mesh affixed to the sides of the filter frame and extending across the open center and located within an air stream;
   at least one conduit for delivering water to said screen mesh; and
   an electronic control unit to control water flow, the electronic control unit being in communication with an ambient air temperature sensor and a relative humidity sensor, the electronic control unit controlling delivery of a water mist or spray from the conduit commensurate with measurements of the ambient air temperature and relative humidity received from the air temperature sensor and the relative humidity sensor, the electronic control unit further controlling water delivery based on condenser liquid discharge line temperature and compressor running status.

2. The cooling system of claim 1, wherein said at least one conduit is integrated within the sides of the filter frame.

3. The cooling system of claim 1, further comprising one or more nozzles positioned on said filter frame for delivering water to said screen mesh.

4. The cooling system of claim 1, wherein said electronic control unit controls water delivery by opening a water solenoid valve provided certain input conditions are met.

5. The cooling system of claim 4, wherein the number of periods or the duration of periods, or both, may vary.

6. The cooling system of claim 1, wherein the screen mesh includes a mesh layer and a filter element.

7. The cooling system of claim 6, wherein the filter element is constructed of a material selected from the group consisting of fiberglass matting and hammock roll fiberglass matting.

8. The cooling system of claim 1, wherein the at least one conduit has a P-shaped cross-section with a central bore, the central bore positioned within a circular part of the P-shape.

9. The cooling system of claim 1, wherein the at least one conduit is notched at slits that extend into a central bore.

10. The cooling system of claim 9, wherein the slits are spaced about one-quarter inch (¼") apart.

11. The cooling system of claim 1, wherein the screen mesh includes a dust screen.

12. The cooling system of claim 1, wherein the at least one conduit is built into the filter frame.

13. The cooling system of claim 1, wherein the screen mesh includes a connecting piece and the filter frame includes a cavity, the connecting piece positioned in the cavity to secure the screen mesh to the filter frame.

14. The cooling system of claim 1, wherein the filter frame is constructed of an extruded polyvinyl chloride material.

15. The cooling system of claim 1, wherein a length of tubing is in fluid communication with the at least one conduit, a portion of the length of tubing is in proximity to or in contact with a refrigeration suction line associated with a compressor.

16. The cooling system of claim 1, wherein in the delivery of the water mist or spray is a pulsed delivery.

\* \* \* \* \*